United States Patent
Molev Shteiman et al.

(10) Patent No.: US 10,638,479 B2
(45) Date of Patent: *Apr. 28, 2020

(54) SYSTEM AND METHOD FOR MULTI-SOURCE CHANNEL ESTIMATION

(71) Applicant: Futurewei Technologies, Inc., Plano, TX (US)

(72) Inventors: Arkady Molev Shteiman, Bridgewater, NJ (US); Xiao-Feng Qi, Westfield, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 47 days.

This patent is subject to a terminal disclaimer.

(21) Appl. No.: 15/226,457

(22) Filed: Aug. 2, 2016

(65) Prior Publication Data

US 2017/0142722 A1 May 18, 2017

Related U.S. Application Data

(63) Continuation-in-part of application No. 14/943,946, filed on Nov. 17, 2015, now Pat. No. 9,654,306, and
(Continued)

(51) Int. Cl.
*H04W 72/04* (2009.01)
*H04L 25/02* (2006.01)
(Continued)

(52) U.S. Cl.
CPC .......... *H04W 72/0453* (2013.01); *H04B 7/04* (2013.01); *H04B 7/0617* (2013.01);
(Continued)

(58) Field of Classification Search
CPC ............. H04W 72/0453; H04W 4/023; H04W 64/006; H04B 7/04; H04B 7/0617;
(Continued)

(56) References Cited

U.S. PATENT DOCUMENTS 5,574,466 A 11/1996 Reed et al.
5,852,630 A 12/1998 Langberg et al.
(Continued)

FOREIGN PATENT DOCUMENTS

CN 101795246 A 8/2010
CN 101944978 A 1/2011
(Continued)

OTHER PUBLICATIONS

Ikegami, et al., "Theoretical Prediction of Mean Field Strength for Urban Mobile Radio," IEEE Transactions on Antennas and Propagation, vol. 39, No. 3, Mar. 1991, 4 pages.
(Continued)

*Primary Examiner* — Ian N Moore
*Assistant Examiner* — Latresa A McCallum
(74) *Attorney, Agent, or Firm* — Slater Matsil, LLP

(57) ABSTRACT

A method includes determining position information of a main transmission sink having a primary transmission path to a communications device and of at least one mirror transmission sink associated with the main transmission sink by at least one secondary transmission path between the main transmission sink and the communications device, estimating primary channels between the communications device and antennas of an antenna array of the main transmission sink and secondary channels between the communications device and antennas of an antenna array of the at least one mirror transmission sink, the estimating is at least partially based on the position information of the main transmission sink and the at least one mirror transmission sink and position information of the antennas in the antenna arrays, and instructing use of the estimated primary channels and the estimated secondary channels.

16 Claims, 32 Drawing Sheets

Related U.S. Application Data a continuation-in-part of application No. 14/944,013, filed on Nov. 17, 2015, now Pat. No. 9,800,384.

(51) Int. Cl.
| | |
|---|---|
| H04W 64/00 | (2009.01) |
| H04B 7/08 | (2006.01) |
| H04B 7/04 | (2017.01) |
| H04B 7/06 | (2006.01) |
| H04W 4/02 | (2018.01) |
| H04L 5/00 | (2006.01) |
| H04B 7/0413 | (2017.01) |

(52) U.S. Cl.
CPC .......... *H04B 7/086* (2013.01); *H04B 7/0897* (2013.01); *H04L 25/0204* (2013.01); *H04L 25/0224* (2013.01); *H04W 4/023* (2013.01); *H04W 64/006* (2013.01); *H04B 7/0413* (2013.01); *H04L 5/0048* (2013.01)

(58) Field of Classification Search
CPC ... H04B 7/0413; H04B 7/086; H04L 25/0204; H04L 5/0048
See application file for complete search history.

(56) References Cited

U.S. PATENT DOCUMENTS

| | | | |
|---|---|---|---|
| 6,349,119 | B1 | 2/2002 | Sogabe et al. |
| 6,487,417 | B1 | 11/2002 | Rossoni et al. |
| 6,738,479 | B1 | 5/2004 | Sibbald et al. |
| 2005/0136943 | A1 | 6/2005 | Banerjee et al. |
| 2006/0072651 | A1 | 4/2006 | Kent et al. |
| 2007/0019769 | A1 | 1/2007 | Green et al. |
| 2008/0085681 | A1* | 4/2008 | Wang .................. H04B 7/0408 455/72 |
| 2009/0029658 | A1 | 1/2009 | Kwak et al. |
| 2010/0135203 | A1 | 6/2010 | Maru |
| 2011/0292827 | A1 | 12/2011 | Li |
| 2012/0219093 | A1 | 8/2012 | Jia et al. |
| 2012/0302177 | A1 | 11/2012 | Maruyama et al. |
| 2013/0244689 | A1 | 9/2013 | Keerthi |
| 2013/0301563 | A1 | 11/2013 | Gupta et al. |
| 2014/0044042 | A1 | 2/2014 | Moshfeghi |
| 2014/0292577 | A1 | 10/2014 | Hosoya et al. |
| 2015/0057007 | A1* | 2/2015 | Tarighat Mehrabani .................... H04B 7/2656 455/452.1 |
| 2015/0171946 | A1 | 6/2015 | Hosoya et al. |
| 2015/0236872 | A1 | 8/2015 | Xiong et al. |
| 2015/0355320 | A1 | 12/2015 | Kim |
| 2016/0043883 | A1* | 2/2016 | Zirwas .............. H04L 25/03891 370/329 |
| 2016/0204914 | A1* | 7/2016 | Agee .................... H04B 7/0413 370/329 |
| 2016/0211898 | A1* | 7/2016 | Cai ...................... H04B 7/0617 |

FOREIGN PATENT DOCUMENTS

| | | |
|---|---|---|
| CN | 102143101 A | 8/2011 |
| CN | 102308228 A | 1/2012 |
| CN | 102340796 A | 2/2012 |
| CN | 102571650 A | 7/2012 |
| CN | 102598533 A | 7/2012 |
| CN | 103595664 A | 2/2014 |
| CN | 104734755 A | 6/2015 |
| EP | 2911435 A1 | 8/2015 |
| JP | H10503915 A | 4/1998 |
| JP | 2001028570 A | 1/2001 |
| JP | 2004015337 A | 1/2004 |
| JP | 2010114652 A | 5/2010 |
| JP | 2011249890 A | 12/2011 |
| WO | 9823043 A1 | 5/1998 |
| WO | 2009017230 A1 | 2/2009 |
| WO | 2011071020 A1 | 6/2011 |

OTHER PUBLICATIONS

Kimpe, et al., "Estimation du canal radio interieur a l'aide de techniques de trace de rayons," Annales Des Telecommunications, vol. 52, Issue 5, May 1997, 5 pages.
Yang, Ni. "MIMO-OFDM, A New Method of MIMO-OFDM Channel Estimation," Northeast Petroleum University School of Electrical & Information Engineering, China Academic Journal Electronic Publishing House, Daqing, China, [no. date] 1994-2017, 2 pages.
Dammann A., et al., "WHERE2 Location Aided Communications," Europoean Wireless, Guildford, UK, Apr. 16-18, 2013, pp. 1-8.
Di Taranto, R., et al., "Location-Aware Communications for 5G Networks," IEEE Signal Processing Magazine, Nov. 2014, pp. 102-112.
Guibene, W., et al., "Degrees of Freedom of Downlink Single- and Multi-Cell Multi-User MIMO Systems with Location Based CSIT," Vehicular Technology Conference, Jun. 5, 2013, pp. 1-5.
Larsson, E. G., et al., "Massive MIMO for Next Generation Wireless Systems," IEEE Communications Magazine, Feb. 2014, pp. 186-195.
Li, J., et al., "Joint Estimation of Channel Parameters for MIMO Communication Systems," Wireless Communications Systems, Sep. 7, 2005, pp. 22-26.
Li, J., et al., "Position Location of Mobile Terminal in Wireless MIMO Communications Systems," Journal of Communications and Networks, vol. 9, No. 3, Sep. 2007, pp. 254-264.
Rusek, F., et al., "Scaling Up MIMO," IEEE Signal Processing Magazine, Jan. 2013, pp. 40-60.
Slock, D., "MIMO Broadcast and Interference Channels with Location based Partial CSIT," European Wireless 2013, Apr. 16-18, 2013, Guildford, UK, pp. 1-6.
Slock, D., "Location Aided Wireless Communications," Proceedings of the 5th International Symposium on Communications, Control and Signal Processing, ISCCSP 2012, Italy, Rome, May 2-4, 2012, 6 pages.
Malik, et al., "Spatio-temporal ultrawideband indoor propagation modelling by reduced complexity geometric optics," IET Commun., Jan. 2007, 9 pages.
Fugen, et al., "MIMO capacities for different antenna arrangements based on double directional wide-band channel measurements," The 13th IEEE International Symposium on Personal, Indoor and Mobile Radio Communications, Sep. 2002, 5 pages.
Burr, "Evaluation of capacity of indoor wireless MIMO channel using ray tracing," 2002 International Zurich, Feb. 21, 2002, 6 pages.
Yamada, et al., "Plane-Wave and Vector-Rotation Approximation Technique for Reducing Computational Complexity to Simulate MIMO Propagation Channel Using Ray-Tracing," IEICE Trans. Commun., vol. E92-B, No. 12, IEICE., Dec. 2009, 12 pages.
Yamada, W. et al, "Ray-tracing-based Technique for Reducing Computational Complexity of MIMO Propagation Channel Estimation", NTT Technical Review, Regular Articles, Feb. 2011, 6 Pages, vol. 9 No. 2.

* cited by examiner

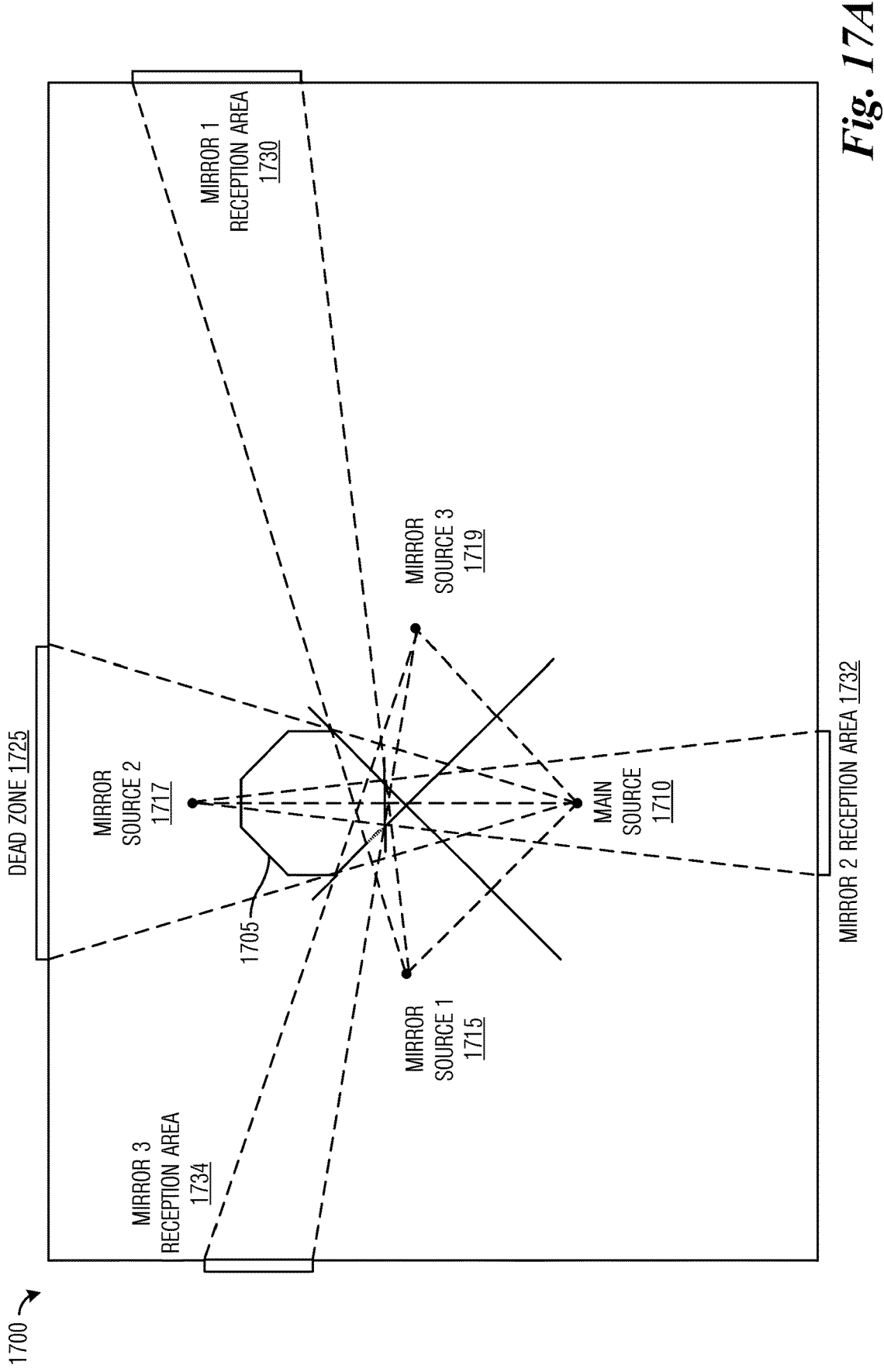

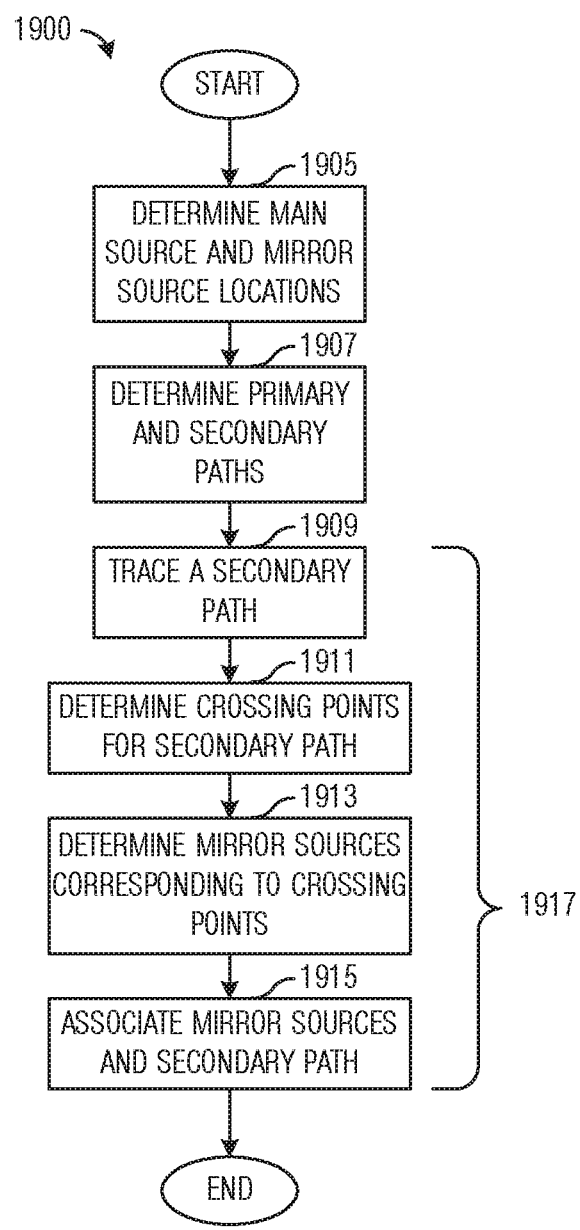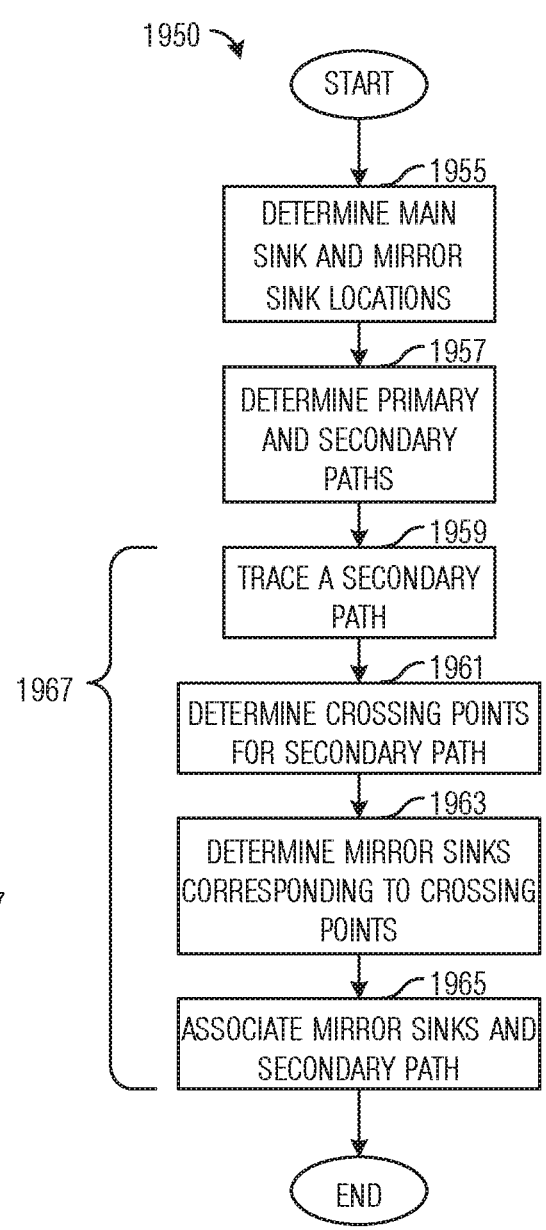
*Fig. 19A*  *Fig. 19B*

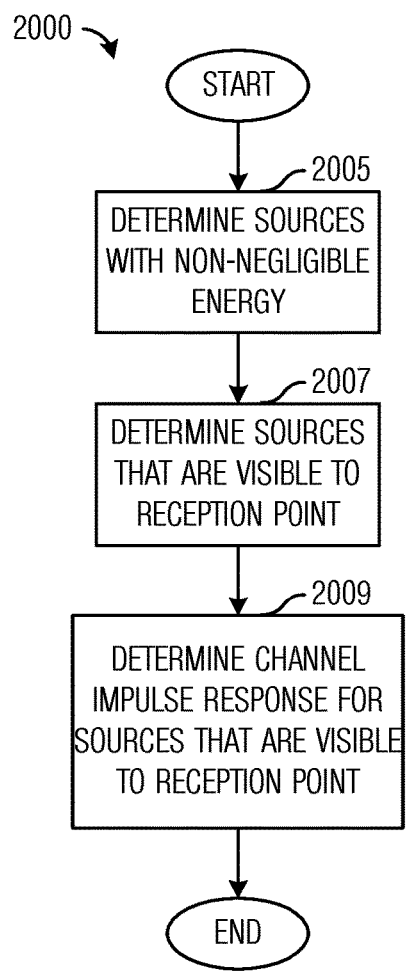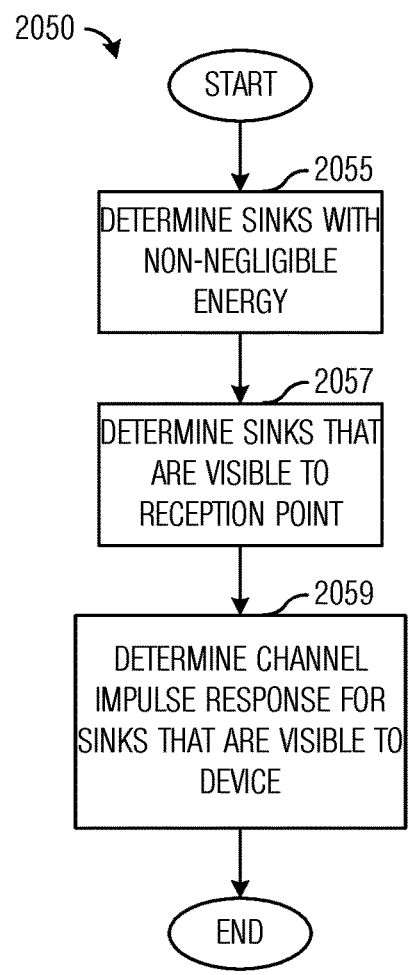
*Fig. 20A*  *Fig. 20B*

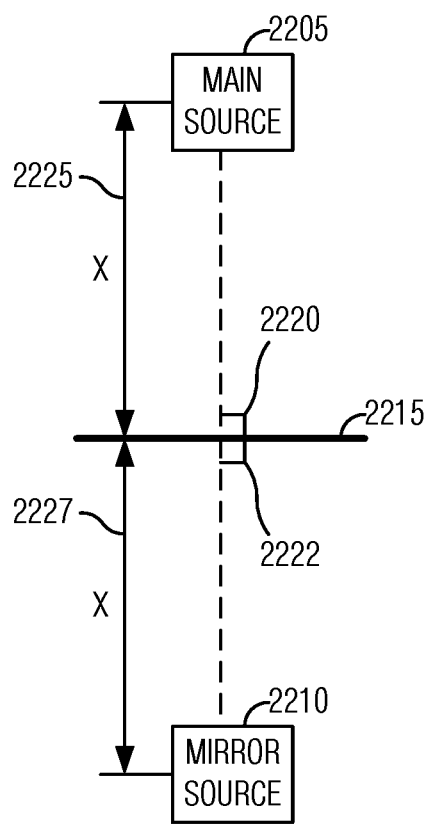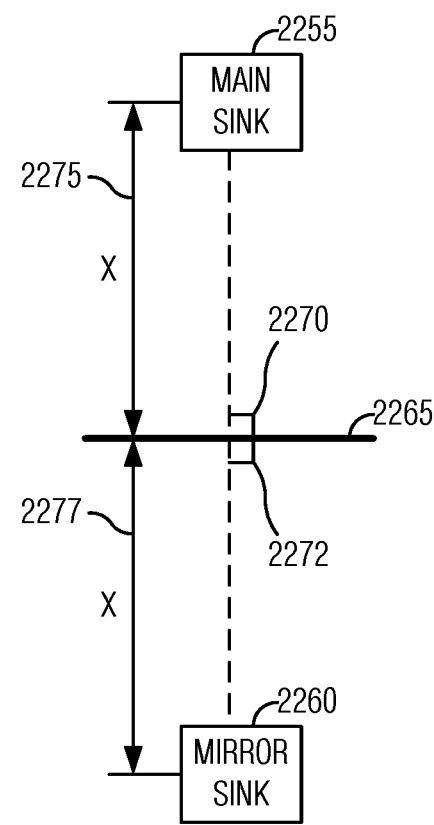
*Fig. 22A*  *Fig. 22B*

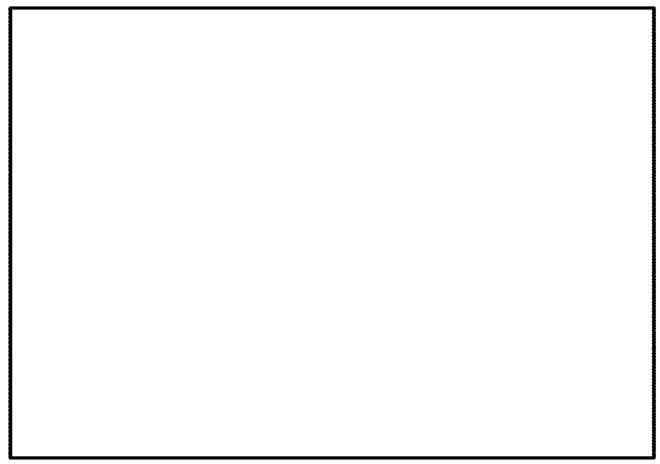
Fig. 24  LOW ENTROPY SPACE
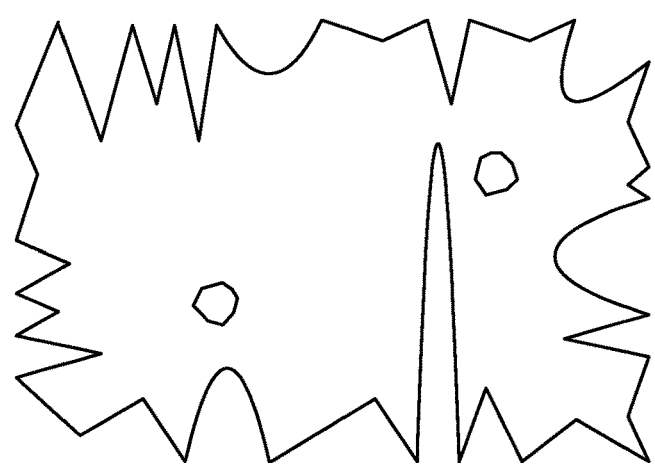
Fig. 25  HIGH ENTROPY SPACE

SYSTEM AND METHOD FOR MULTI-SOURCE CHANNEL ESTIMATION

This application is a continuation-in-part of U.S. application Ser. No. 14/944,013, filed on Nov. 17, 2015, entitled "System and Method for Multi-Source Channel Estimation," and Ser. No. 14/943,946, filed on Nov. 17, 2015, entitled "System and Method for Multi-Source Channel Estimation," which applications are hereby incorporated herein by reference.

TECHNICAL FIELD

The present disclosure relates generally to digital communications, and more particularly to a system and method for multi-source channel estimation.

BACKGROUND

In general, multiple input multiple output (MIMO) operation increases the capacity of a radio link through the use of multiple transmit antennas and multiple receive antennas. MIMO exploits multipath propagation to increase the capacity of the radio link. MIMO has proven to be effective at increasing the capacity of the radio link and has been accepted into a variety of technical standards, including: WiFi or Wireless LAN, such as IEEE 802.11n and IEEE 802.11ac; Evolved High-Speed Packet Access (HSPA+); Worldwide Interoperability for Microwave Access (Wi-MAX); and Third Generation Partnership Project (3GPP) Long Term Evolution (LTE) Advanced.

Increasing the number of transmit antennas and receive antennas from a relatively small number (on the order of 10 or fewer) to a significantly larger number (on the order of 100, 1000, 10000, or more) can lead to even greater increases in the capacity of the radio link. Such MIMO communications systems are referred to as large-scale MIMO communications systems.

Channel estimation is a complex and time intensive operation in which the characteristics of a communication channel are estimated for the purpose of reducing transmission error rates and improving efficiency. Under the multipath model, channel estimation is performed for every multi-path at each antenna and involves individually receiving reference signals transmitted over each multi-path for each transmitter-receiver pair. Therefore, at a MIMO communications device, such as a large scale MIMO communications device, the number of channel estimations can be very large. For example, in a 10000 antenna MIMO communications device with 3 multi-paths, there will be 30000 channel estimations even for a user equipped with a single antenna. Additionally, since the user may move or the environment changes, the channel estimations may be repeated regularly to maintain effective models. Therefore, the signaling overhead and the computational complexity significantly impacts overall communications system performance in a negative way.

SUMMARY OF THE DISCLOSURE

Example embodiments provide a system and method for multi-source channel estimation In accordance with an example embodiment, a method for channel estimation is provided. The method includes determining, by a communications device, position information of a main transmission sink having a primary transmission path to the communications device and of at least one mirror transmission sink associated with the main transmission sink by at least one secondary transmission path between the main transmission sink and the communications device. The method includes estimating, by the communications device, primary channels between the communications device and antennas of an antenna array of the main transmission sink and secondary channels between the communications device and antennas of an antenna array of the at least one mirror transmission sink, the estimating is in accordance with the position information of the main transmission sink and the at least one mirror transmission sink and position information of the antennas in the antenna arrays, and instructing, by the communications device, use of the estimated primary channels and the estimated secondary channels.

In accordance with another example embodiment, a communications device is provided. The communications device includes a processor, and a computer readable storage medium storing programming for execution by the processor. The programming including instructions to configure the communications device to determine position information of a main transmission sink having a primary transmission path to the communications device and of at least one mirror transmission sink associated with the main transmission sink by at least one secondary transmission path between the main transmission sink and the communications device. The programming includes instructions to configure the communications device to estimate primary channels between the communications device and antennas of an antenna array of the main transmission sink and secondary channels between the communications device and antennas of an antenna array of the at least one mirror transmission sink, the estimating is in accordance with the position information of the main transmission sink and the at least one mirror transmission sink and position information of the antennas in the antenna arrays, and instruct use of the estimated primary channels and the estimated secondary channels.

In accordance with another example embodiment, a non-transitory computer-readable medium storing programming for execution by at least one processor is provided. The programming including instructions to determine position information of a main transmission sink having a primary transmission path to the communications device and of at least one mirror transmission sink associated with the main transmission sink by at least one secondary transmission path between the main transmission sink and the communications device. The programming includes instruction to estimate primary channels between the communications device and antennas of an antenna array of the main transmission sink and secondary channels between the communications device and antennas of an antenna array of the at least one mirror transmission sink, the estimating is in accordance with the position information of the main transmission sink and the at least one mirror transmission sink and position information of the antennas in the antenna arrays, and exchange information of the estimated primary channels and the estimated secondary channels with the other communications devices.

Practice of the foregoing embodiments enables low complexity channel estimation in a large scale MIMO communications device by determining signal source positions and estimating the channels between the signal sources and individual receive antennas using positional information of the signal sources and the receive antennas.

Practice of the foregoing embodiments further enables low complexity channel estimation in a large scale MIMO communications device by determining signal sink positions and estimating the channels between a signal source and the signal sinks (and receive antennas thereof) using positional information of the signal source and the signal sinks (and receive antennas thereof).

BRIEF DESCRIPTION OF THE DRAWINGS

For a more complete understanding of the present disclosure, and the advantages thereof, reference is now made to the following descriptions taken in conjunction with the accompanying drawing, in which:

FIG. 17A illustrates a second example deployment of communications system according to example embodiments described herein;

FIG. 19A illustrates a flow diagram of example high level operations occurring in a device determining associations between sources (main and mirror) and paths according to example embodiments described herein;

FIG. 19B illustrates a flow diagram of example high level operations occurring in a device determining associations between sinks (main and mirror) and paths according to example embodiments described herein;

FIGS. 20A and 20B illustrate flow diagrams of operations occurring in a device performing channel estimation from information about sources and paths, and sinks and paths according to example embodiments described herein;

FIG. 22A illustrates a diagram of a relationship between a main source, a mirror source, and a reflective surface according to example embodiments described herein;

FIG. 22B illustrates a diagram of a relationship between a main sink, a mirror sink, and a reflective surface according to example embodiments described herein;

FIG. 24 illustrates an example low entropy environment according to example embodiments described herein;

FIG. 25 illustrates an example high entropy environment according to example embodiments described herein;

DETAILED DESCRIPTION OF ILLUSTRATIVE EMBODIMENTS

The operation of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to multi-source channel estimation. For example, a communications device determines position information of a main transmission sink having a primary transmission path to the communications device and of at least one mirror transmission sink associated with the main transmission sink by at least one secondary transmission path between the main transmission sink and the communications device, estimates primary channels between the communications device and antennas of an antenna array of the main transmission sink and secondary channels between the communications device and antennas of an antenna array of the at least one mirror transmission sink, the estimating is at least partially based on the position information of the main transmission sink and the at least one mirror transmission sink and position information of the antennas in the antenna arrays, and instructs use of the estimated primary channels and the estimated secondary channels.

The embodiments will be described with respect to example embodiments in a specific context, namely MIMO communications systems that support very large scale beamforming with antenna arrays having large numbers of transmit antennas and receive antennas. The embodiments may be applied to standards compliant communications systems, such as those that are compliant with Third Generation Partnership Project (3GPP), IEEE 802.11, WiMAX, HSPA, and the like, as well as non-standards compliant MIMO communications systems, that support beamforming with antenna arrays having very large numbers of transmit antennas and receive antennas.

Figure 1:
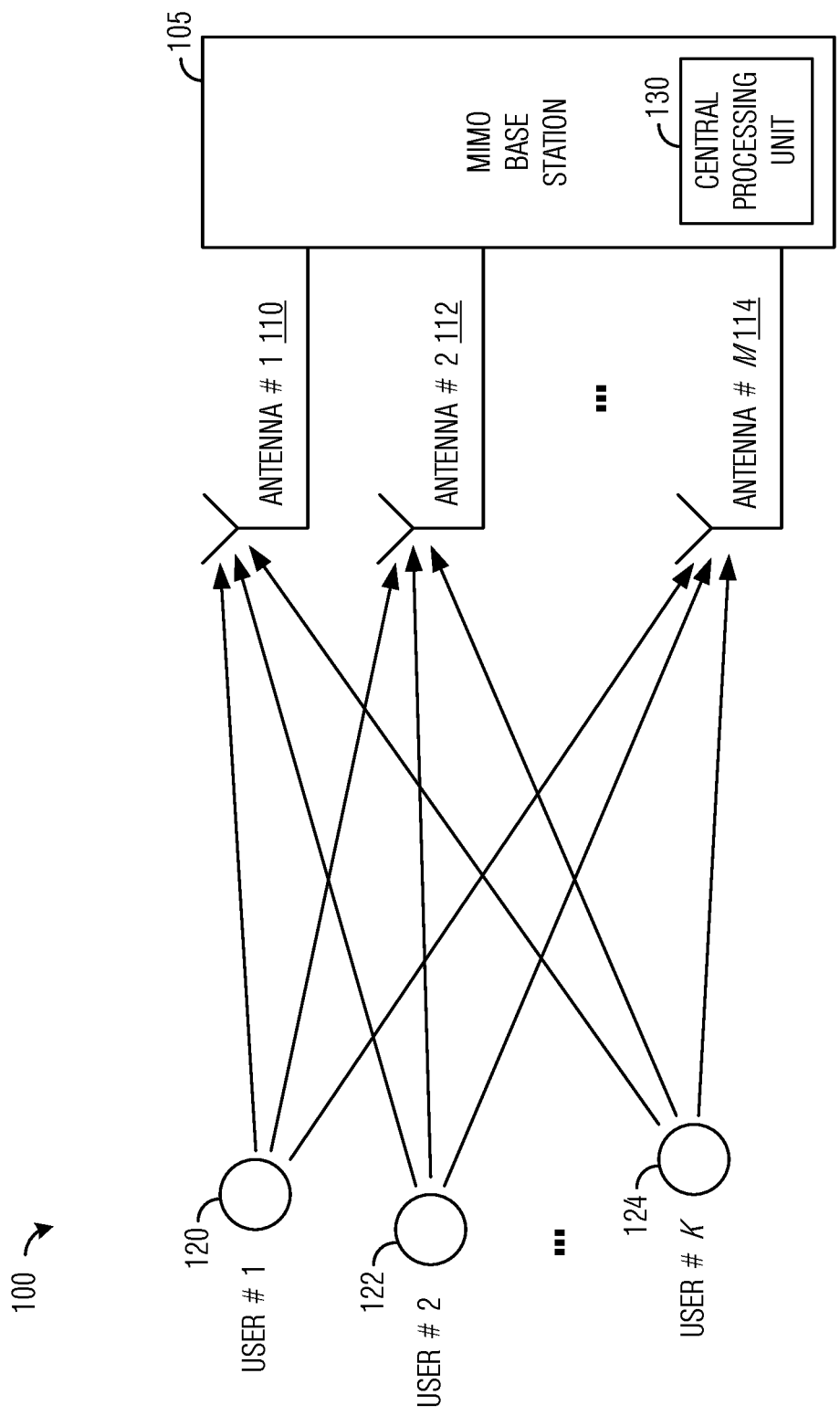
FIG. 1 illustrates an example communications system highlighting MIMO reception according to example embodiments described herein.

FIG. 1 illustrates an example communications system 100 highlighting MIMO reception. Communications system 100 includes a MIMO base station 105 serving K users, such as user #1 120, user #2 122, and user # K 124, where K is an integer number greater than or equal to 1. MIMO base station 105 includes M receive antennas, such as antenna #1 110, antenna #2 112, and antenna # M 114, where M is an integer number greater than or equal to 1. In a large scale MIMO implementation, M may be on the order of 100, 1000, 10000, or even greater. A special case of large scale MIMO is referred to as massive MIMO. Massive MIMO may involve an extremely large number of antennas, 100000 or more. A base station may also be referred to as an access point, a NodeB, an evolved NodeB (eNB), a communications controller, and so on, while a user may also be referred to as a mobile station, a mobile, a terminal, a subscriber, a user equipment (UE), and so forth. MIMO base station 105 also includes a central processing unit 130 configured to estimate signals transmitted by the users and received by MIMO base station 105.

While it is understood that communications systems may employ multiple base stations capable of communicating with a number of users, only one base station, and K users are illustrated for simplicity.

In communications system 100, the K users share the same communications system resources (such as time-frequency resources). To simplify discussion, each user is equipped with only one antenna. However, the example embodiments presented herein are operable with users with any number of antennas. Each of the M receive antennas at MIMO base station 105 are equipped with its own radio frequency (RF) hardware (such as filters, amplifiers, mixers, modulators, demodulators, constellation mappers, constellation demappers, and the like), analog to digital (A/D) converters, digital to analog (D/A) converters, as well as a local processing unit that is capable of performing a limited amount of processing. The local processing unit, the antenna and the associated hardware may be referred to as an antenna unit (AU). The local processing unit is referred to herein as an AU processing unit.

Communications system 100 may be represented as a mathematical model expressible as:

$$\begin{bmatrix} y_1 \\ y_2 \\ \vdots \\ y_M \end{bmatrix} = \begin{bmatrix} a_{1,1} & a_{1,2} & \dots & a_{1,K} \\ a_{2,1} & a_{2,2} & \dots & a_{2,K} \\ \vdots & \vdots & & \vdots \\ a_{M,1} & a_{M,2} & \dots & a_{M,K} \end{bmatrix} \cdot \begin{bmatrix} x_1 \\ x_2 \\ \vdots \\ x_K \end{bmatrix} + \begin{bmatrix} n_1 \\ n_2 \\ \vdots \\ n_M \end{bmatrix}$$

or $$Y = A \cdot X + N,$$

where X is a transmitted symbol vector of length K in which each element $x_k$ represents a data symbol associated with user k; Y is a received sample vector of length M in which each element $y_m$ represents a sample of receive antenna m; N is a receiver noise sample vector of length M in which each element $n_m$ represents the noise received on receive antenna m, it is assumed that N is additive white Gaussian noise (AWGN); A is a channel matrix of size M by K in which each element $\alpha_{m,k}$ represents a channel transfer function between user k and receive antenna m; K is the number of users served by MIMO base station 105; and M is the number of receive antennas of MIMO base station 105. In general, a MIMO receiver has to resolve the above expression and given the received sample vector Y, find an estimate of the transmitted symbol vector X (denoted $\hat{X}$) that is as close as possible to the transmitted symbol vector X.

Figure 2:
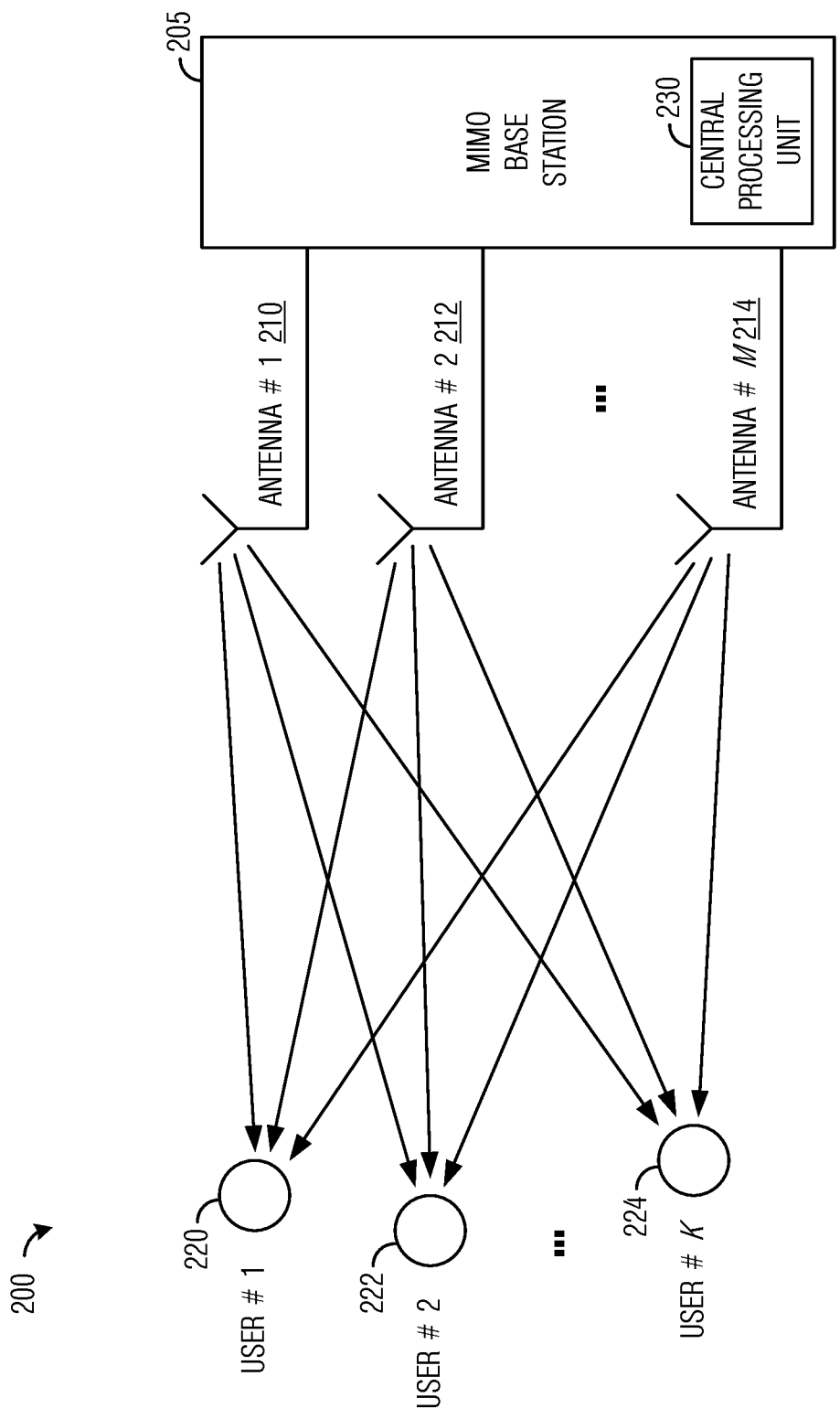
FIG. 2 illustrates an example communications system highlighting MIMO transmission according to example embodiments described herein.

FIG. 2 illustrates an example communications system 200 highlighting MIMO transmission. Communications system 200 includes a MIMO base station serving K users, such as user #1 220, user #2 222, and user # K 224, where K is an integer number greater than or equal to 1. MIMO base station 205 includes M transmit antennas, such as antenna #1 210, antenna #2 212, and antenna # M 214, where M is an integer number greater than or equal to 2. In a large scale MIMO implementation, M may be on the order of 100, 1000, 10000, or even greater. MIMO base station 205 also includes a central processing unit 230 configured to assist in precoding transmissions to the K users. Central processing unit 230 is also configured to assist in channel estimation.

Communications system 200 may be represented as a mathematical model expressible as:

$$\begin{bmatrix} r_1 \\ r_2 \\ \vdots \\ r_K \end{bmatrix} = \begin{bmatrix} a_{1,1} & a_{1,2} & \cdots & a_{1,M} \\ a_{2,1} & a_{2,2} & \cdots & a_{2,M} \\ \vdots & \vdots & & \vdots \\ a_{K,1} & a_{K,2} & \cdots & a_{K,M} \end{bmatrix} \cdot \begin{bmatrix} w_{1,1} & w_{1,2} & \cdots & w_{1,K} \\ w_{2,1} & w_{2,2} & \cdots & w_{2,K} \\ \vdots & \vdots & & \vdots \\ w_{M,1} & w_{M,2} & \cdots & w_{M,K} \end{bmatrix} \cdot \begin{bmatrix} x_1 \\ x_2 \\ \vdots \\ x_K \end{bmatrix} + \begin{bmatrix} n_1 \\ n_2 \\ \vdots \\ n_K \end{bmatrix}$$

or $$R = A \cdot W \cdot X + N,$$

where X is a transmitted symbol vector of length K in which each element $x_k$ represents a symbol of user k; R is a received sampled vector of length K in which each element $r_k$ represents a sample received by user k; N is a received noise vector of length K in which each element $n_k$ represents noise received by user k (it is assumed that N is AWGN); A is a channel matrix of size M by K in which each element $a_{m,k}$ represents the channel transfer function between user k and transmit antenna m; and W is a precoding matrix of size K by M.

As discussed previously, beamforming is a signal processing technique used for directional communications (signal transmission and/or reception). Beamforming involves combining antenna elements in such a way that some directions experience constructive interference while other directions experience destructive interference, therefore generating a communications beam in an intended direction. Therefore, in order to utilize beamforming, a communications device needs to obtain directional information regarding other communications devices with which it is communicating. From the directional information, the communications device may be able to generate antenna coefficients to generate communications beams directed towards the other communications devices.

In the far field, the distance between an antenna array of a large scale MIMO communications device and a UE is sufficiently large (generally, the distance between the large scale MIMO communications device and the UE is more than an order of magnitude greater than the dimensions of the antenna array) so that communications beams arriving at the antenna array from the UE are considered to be parallel. However, in the near field, the assumption of the parallel communications beams does not hold up since the distance between the large scale MIMO communications device and the UE is relatively small.

Figure 3A:
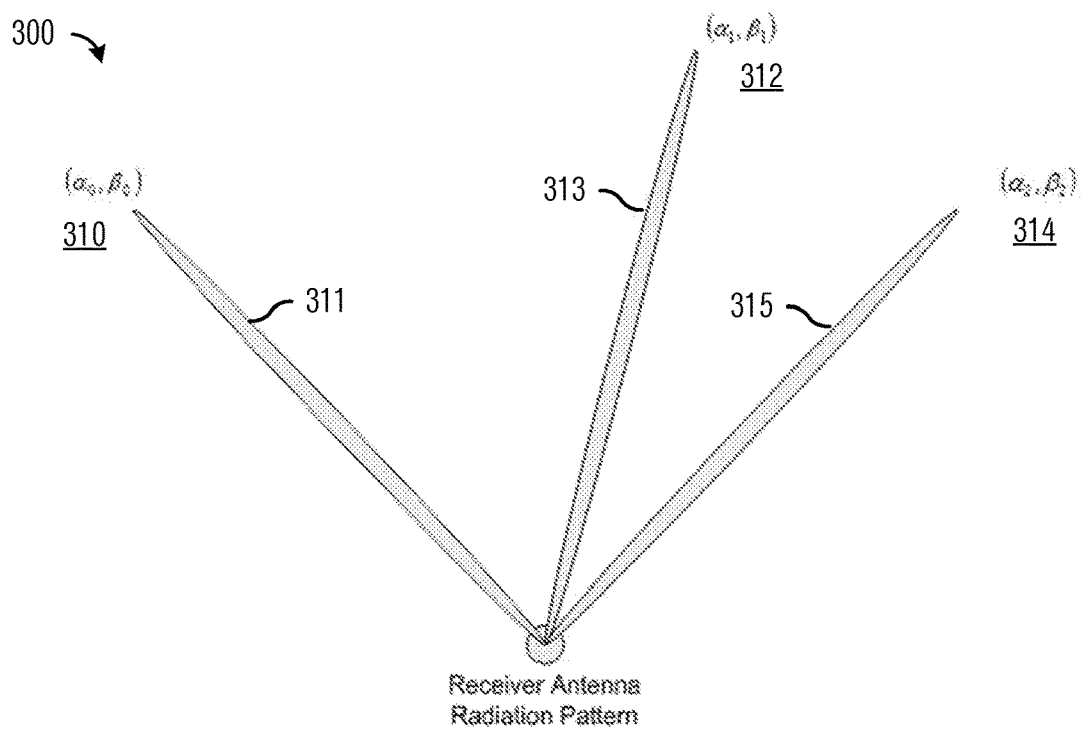
FIG. 3A illustrates a multi-beam channel model 300 of an example communications system according to example embodiments described herein.

FIG. 3A illustrates a multi-beam channel model 300 of an example communications system. Model 300 is for a receive antenna, but also applies to a transmit antenna. As shown in FIG. 3A, a receive antenna 305 has three antenna beams, beams 311, 313, and 315 oriented at three sources, sources 310, 312, and 314, respectively. In a random displacement situation, a channel between a source and an antenna m located at ($x_m$, $y_m$, $z_m$) is expressible as $$H_m = \sum_{k=0}^{K-1} G_k \cdot \exp\left(j \cdot 2 \cdot \pi \cdot \frac{x_m \cdot \cos(\alpha_k) \cdot \cos(\beta_k) + y_m \cdot \cos(\alpha_k) \cdot \sin(\beta_k) + z_m \cdot \sin(\alpha_k)}{\lambda}\right),$$

where $G_k$ is the complex amplitude of beam k, and $\alpha_k$ and $\beta_k$ are the orientations beam k.

Figure 3B:
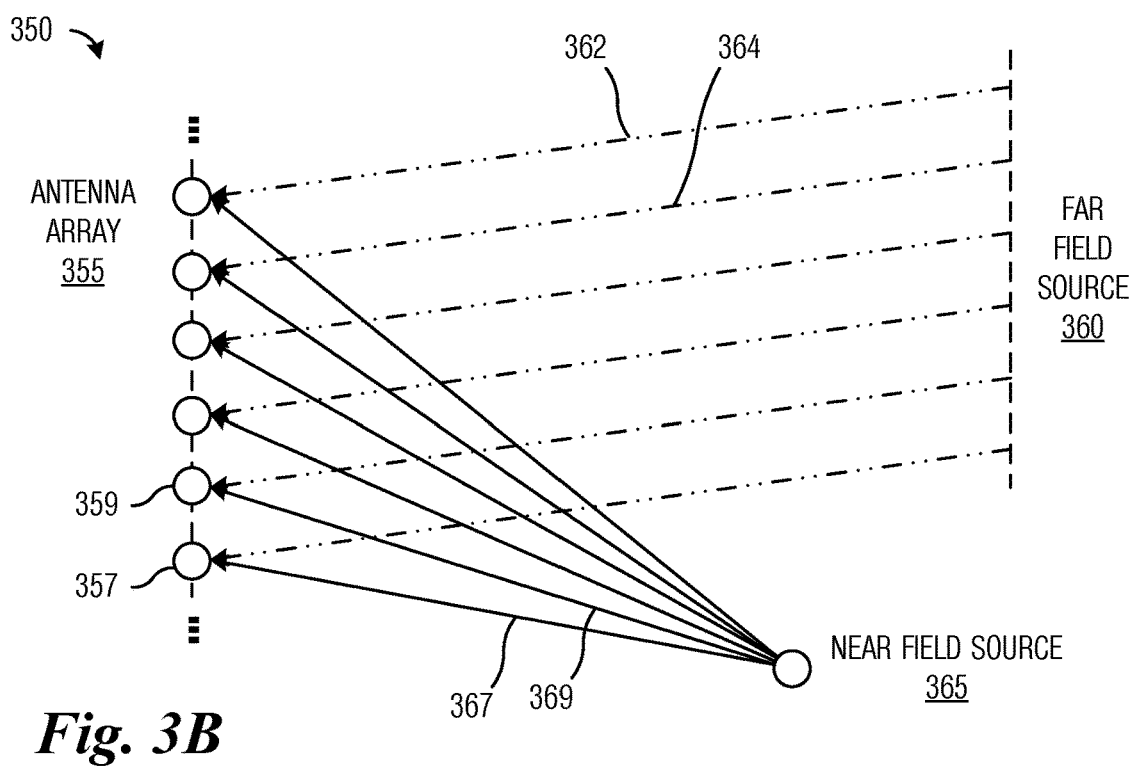
FIG. 3B illustrates an example communications system highlighting far field sources and near field sources according to example embodiments described herein.

FIG. 3B illustrates an example communications system 350 highlighting far field sources and near field sources. Communications system 350 includes an antenna array 355 that includes a plurality of antennas, such as antenna 357 and antenna 359. Communications system 350 also includes a far field source 360 and a near field source 365. Far field source 360 is located at least an order of magnitude further away from antenna array 355 than the dimensions of antenna array 355, while near field source 365 is located less than an order of magnitude of the dimensions of antenna array 355 away from antenna array 355.

Communications beams from far field source 360, such as communications beams 362 and 364, are parallel (or substantially parallel) as they arrive at antenna array 355. Since the communications beams are parallel, they have the same direction of arrival. On the other hand, communications beams from near field source 365, such as communications beams 367 and 369, are not parallel as they arrive at antenna array 355. Hence the directions of arrival of the communications beams from near field source 365 are different.

Figure 4A:
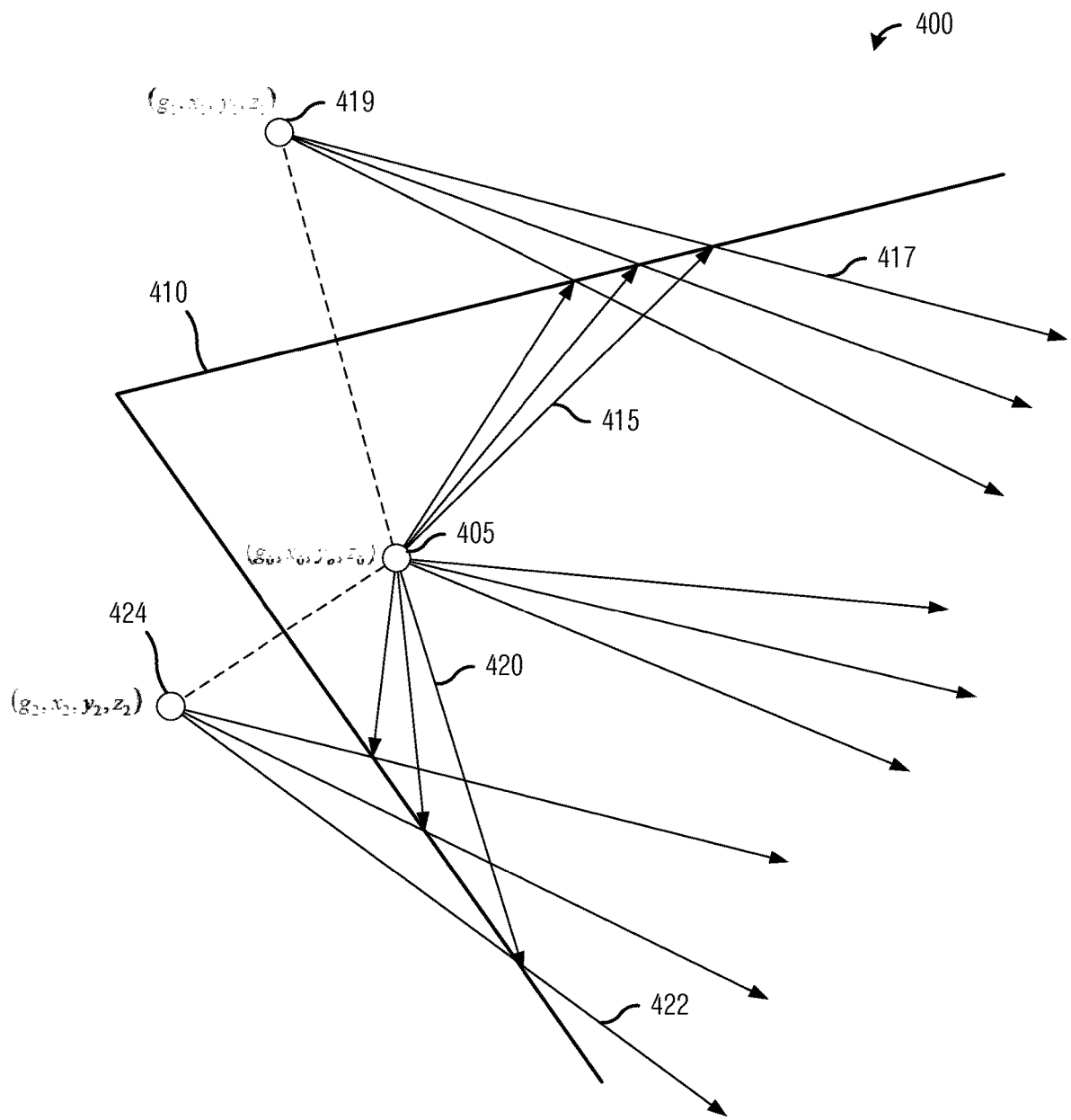
FIG. 4A illustrates an example communications system, highlighting mirror sources according to example embodiments described herein.

FIG. 4A illustrates an example communications system 400, highlighting mirror sources. Communications system 400 includes a source 405, with complex gain $g_0$ and located at ($x_0$, $y_0$, $z_0$). Source 405 is located near a reflective surface 410. A transmission incident on reflective surface 410 will reflect based on an angle of incidence. As an example, a transmission along path 415 will reflect as a transmission along path 417. The transmission along path 417 may be modeled as originating from mirror source 419, which has complex gain $g_1$ and located at ($x_1$, $y_1$, $z_1$). Similarly, a transmission along path 420 will reflect as a transmission along path 422. The transmission along path may be modeled as originating from mirror source 424, which has complex gain $g_2$ and located at ($x_2$, $y_2$, $z_2$).

In general, a representation of a communications channel between a source k and a receive antenna m is expressible as $$H_m = \sum_{k=0}^{K-1} G_k \cdot \exp\left(j \cdot 2 \cdot \pi \cdot \frac{\sqrt{(x_m - x_k)^2 + (y_m - y_k)^2 + (z_m - z_k)^2}}{\lambda}\right),$$

where ($x_m$, $y_m$, $z_m$) is the location of antenna m, ($x_k$, $y_k$, $z_k$) is the location of source k, $G_k$ is the complex gain of source k, and $\lambda$ is the transmission signal wavelength.

When a transmission is made from a transmission point (e.g., an access point (AP) in a downlink transmission or a UE in an uplink transmission) to a reception point (e.g., the UE in the downlink transmission or the AP in the uplink transmission), the transmission may take a primary path from the transmission point to the reception point. However, if there are objects in the vicinity of the transmission point and the reception point, the transmission may reflect off these objects and take secondary paths from the transmission point to the reception point. In general, a primary path is a direct path between a transmission point and a reception point. There are also secondary paths that involve the transmission reflecting off one or more surfaces after leaving the transmission point before arriving at the reception point. The transmissions taking the primary and secondary paths to the reception point may be referred to as multipath. The transmissions taking the secondary paths have greater delay than the transmissions taking the primary path due to the longer path. The transmissions on the secondary paths may be exploited to improve communications performance or they may be interference and degrade performance. Each of the paths (primary and secondary) may be modeled by using channel estimation techniques. However, when the reception point has a large scale MIMO antenna array, channel estimation may be computationally intensive since channel estimation is performed at each antenna for each path (primary and secondary).

Figure 4B:
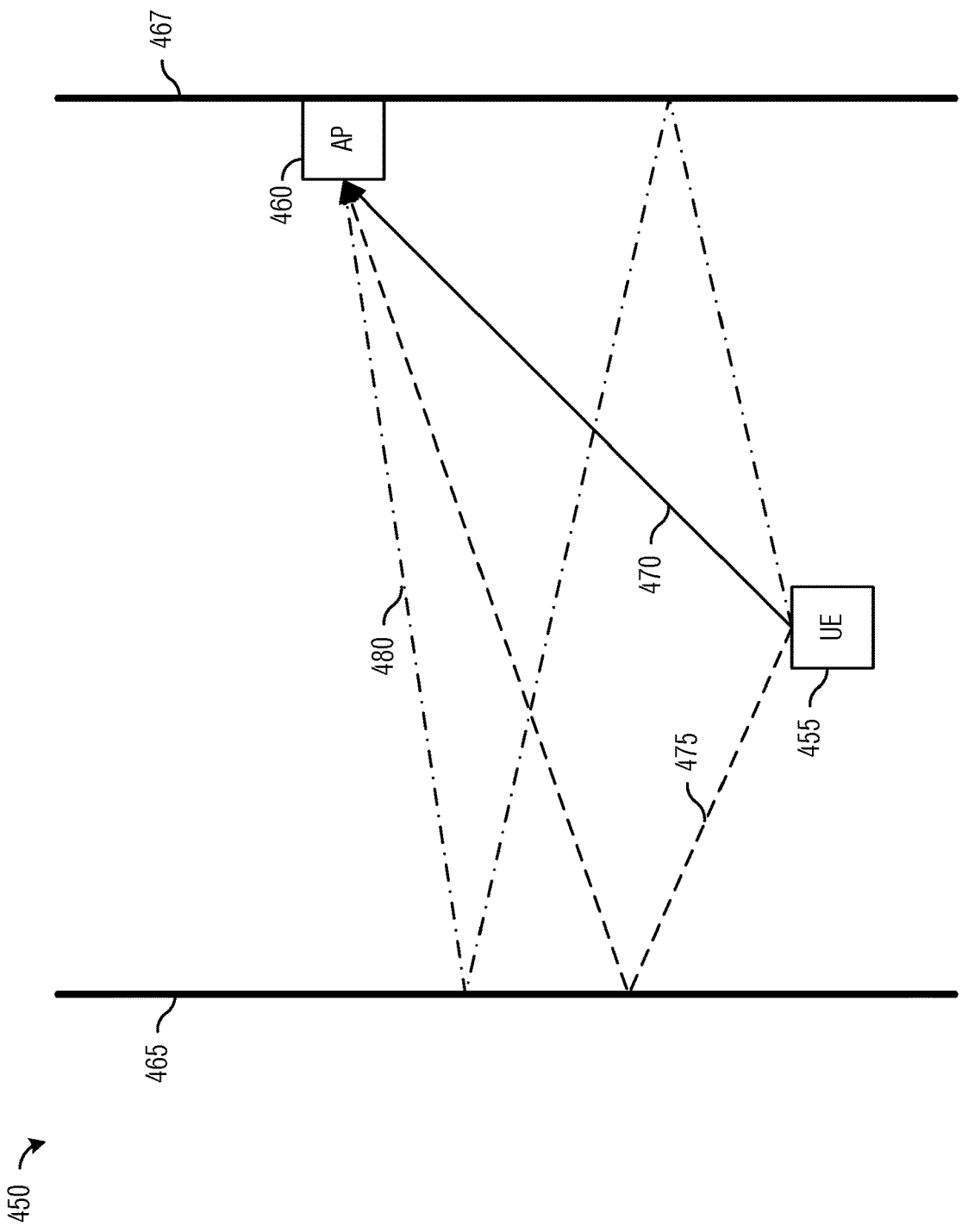
FIG. 4B illustrates an example communications system, highlighting primary and secondary paths according to example embodiments described herein.

FIG. 4B illustrates an example communications system 450, highlighting primary and secondary paths. Communications system 450 includes communicating devices, UE 455 and AP 460. As shown in FIG. 4B, UE 455 is making an uplink transmission to AP 460. In other words, UE 455 is the transmission point and AP 460 is the reception point. Communications system 450 is deployed in between a first wall 465 and a second wall 467. As an example, communications system 450 is deployed indoors.

When UE 455 sends a transmission to AP 460, the transmission may follow a primary path 470. The transmission may also follow several secondary paths, such as first secondary path 475 where the transmission reflects off first wall 465 before arriving at AP 460, or a second secondary path 480 where the transmission reflects off second wall 467 and first wall 465 before arriving at AP 460. In general, when there are more objects in the vicinity of the communicating devices, the more paths there are between the communicating devices. However, depending on the type of objects involved, significant power is lost at each reflection. Therefore transmissions over paths comprising more than three or four reflections may be so low in power that they may not be significant and it is possible to ignore them.

According to an example embodiment, transmissions taking secondary paths are modeled as originating at mirror sources instead of originating at their main source and reflecting off intermediary objects. A transmission following a secondary path that includes one or more reflections may be modeled as originating at a mirror source and following a primary path rather than originating at the main source and following the secondary path.

Figure 5:
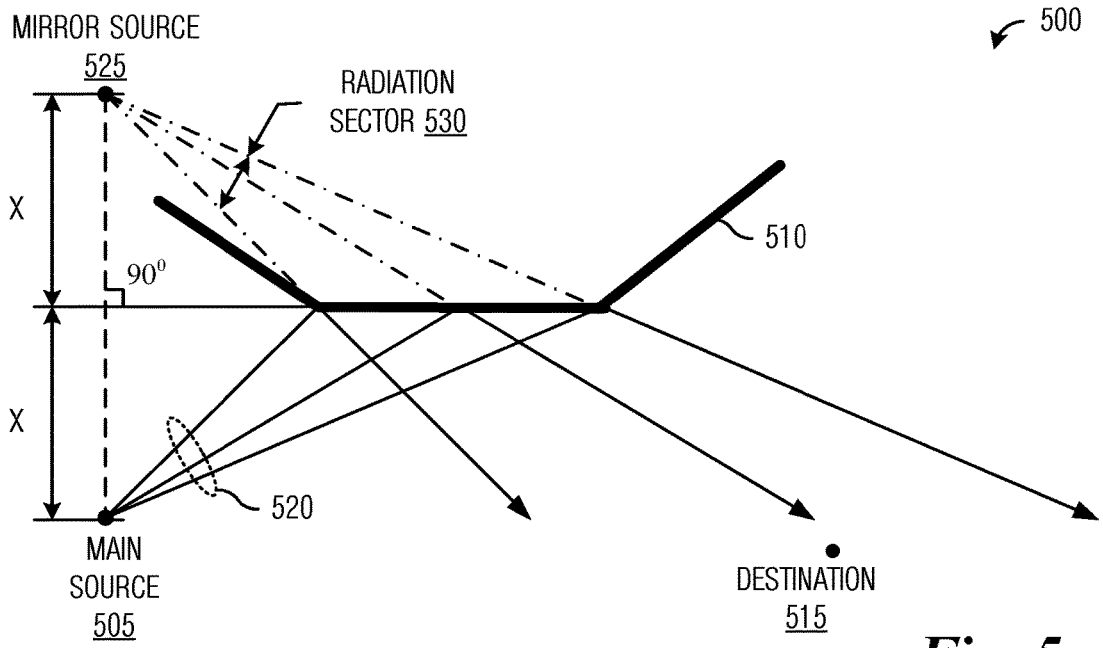
FIG. 5 illustrates an example communications system highlighting the modeling of a transmission following a secondary path and reflecting off a flat surface according to example embodiments described herein.

FIG. 5 illustrates an example communications system 500 highlighting the modeling of a transmission following a secondary path and reflecting off a flat surface. In communications system 500, a transmission originates at main source 505 and reflects off reflective surface 510 towards a destination 515. A range of transmissions 520 reflects off reflective surface 510 while maintaining an orientation towards destination 515. It is possible to model the transmissions reflecting off reflective surface 510 as originating at a mirror source 525. A mirror source is an imaginary source that corresponds to a main source, relative to a reflective surface. The location of a mirror source depends upon a geometric relationship between the main source and the reflective surface. As an example, for a flat reflective surface, the mirror source is located on an orthogonal line that connects the main source to the flat reflective surface (or an extension of the flat reflective surface), where the mirror source is equidistant relative to the flat reflective surface as the main source is to the flat reflective surface, except that the mirror source is on the opposite side of the flat reflective surface (or the extension thereof). This geometric relationship is shown in FIG. 5 for main source 505, mirror source 525, and reflective surface 510.

Transmissions from mirror source 525 pass through reflective surface 510 on towards destination 515. A radiation sector 530 corresponds to a range of transmission angles that correspond to range of transmissions 520. As shown in FIG. 5, secondary paths due to reflective surface 510 may be modeled as mirror source 525 that is symmetrical to main source 505 with respect to reflective surface 510. As the size of reflective surface 510 increases, the likelihood that multiple destinations will receive transmissions from mirror source 525 also increases.

Figure 6:
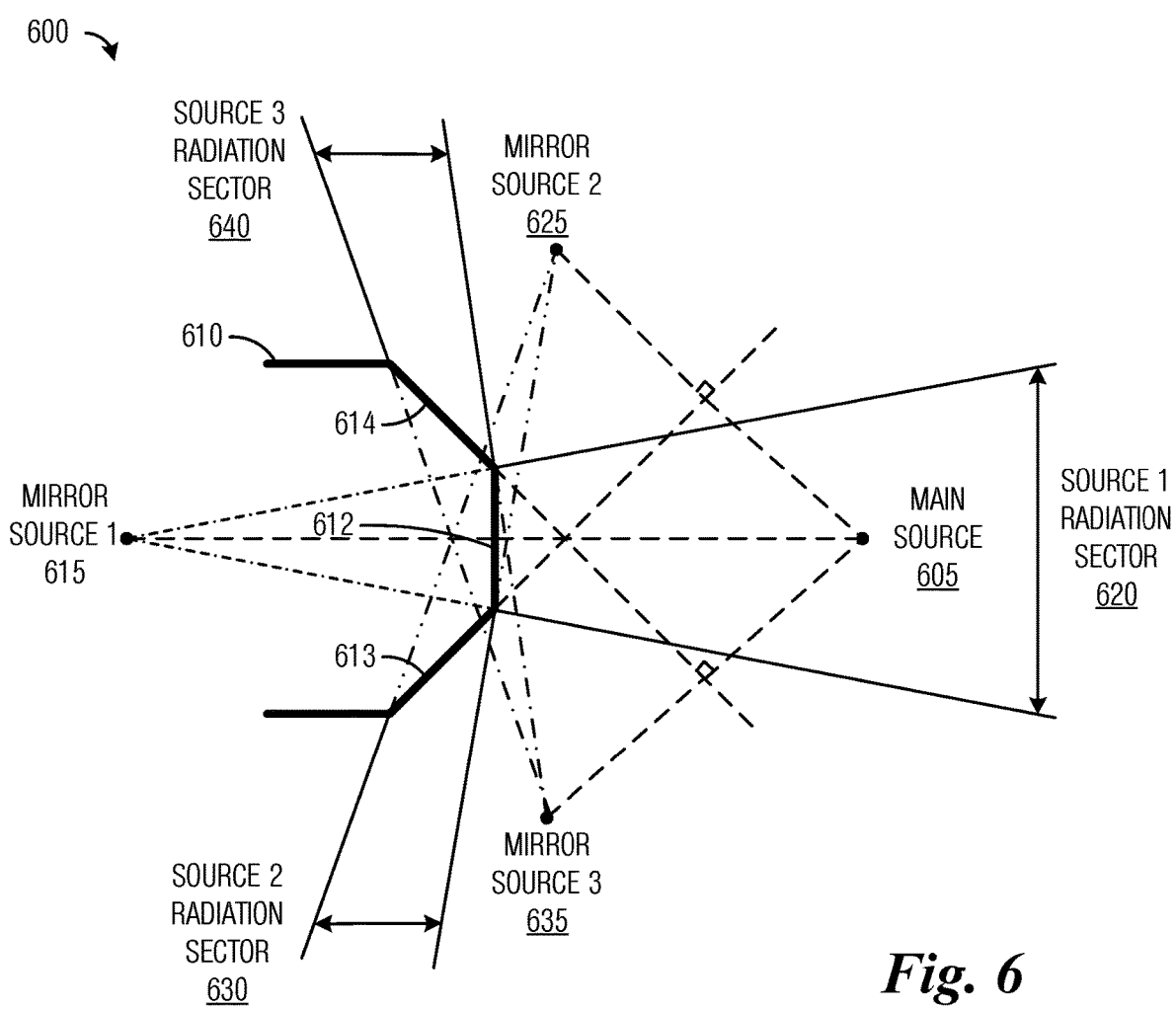
FIG. 6 illustrates an example communications system highlighting the modeling of a transmission following a secondary path and reflecting off a broken surface according to example embodiments described herein.

FIG. 6 illustrates an example communications system 600 highlighting the modeling of a transmission following a secondary path and reflecting off a broken surface. In communications system 600, a transmission originates at main source 605 and reflects off reflective surface 610. It is possible to model the transmissions reflecting off reflective surface 610 as originating at one of a plurality of mirror sources depending upon where on reflective surface 610 the transmission reflects. As an illustrative example, a transmission reflecting off a first sub-surface 612 may be modeled as originating at mirror source1 615 with a corresponding source1 radiation sector 620. Similarly, a transmission reflecting off a second sub-surface 613 may be modeled as originating at mirror source2 625 with a corresponding source2 radiation sector 630 and a transmission reflecting off a third sub-surface 614 may be modeled as originating at mirror source 3 635 with a corresponding source3 radiation sector 640. Since the radiation sectors of mirror sources arising from the broken surface tend to be small, the likelihood that multiple destinations will receive transmissions reflecting off from the broken surface is small.

Figure 7:
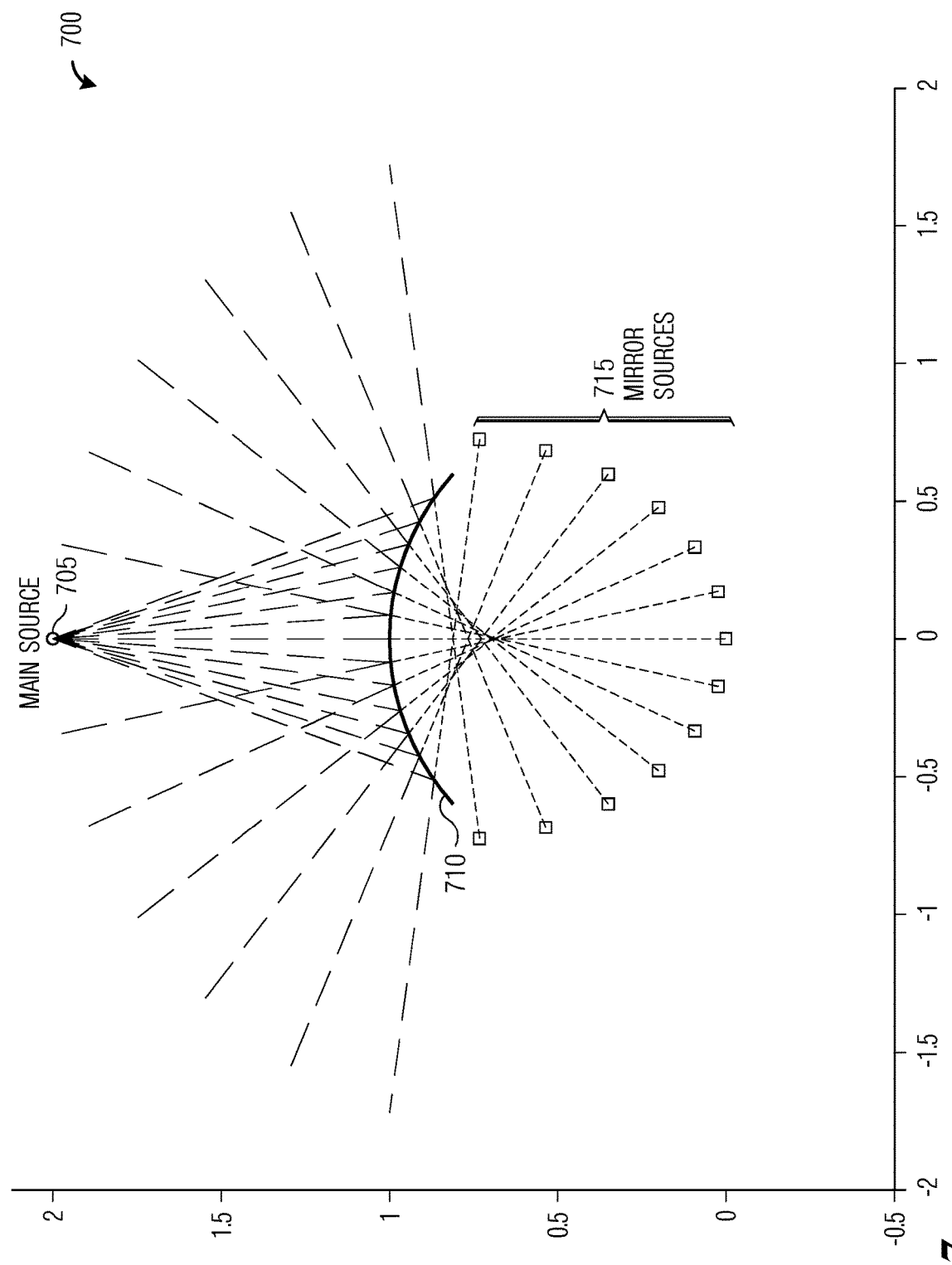
FIG. 7 illustrates an example communications system highlighting the modeling of a transmission following a secondary path and reflecting off a curved surface according to example embodiments described herein.

FIG. 7 illustrates an example communications system 700 highlighting the modeling of a transmission following a secondary path and reflecting off a curved surface. The curved surface may be modeled as an infinite number of small flat surfaces. In communications system 700, a transmission originates at main source 705 and reflects off reflective surface 710. It is possible to model the transmissions reflecting off reflective surface 710 as originating at one of a plurality of mirror sources (mirror sources 715) depending upon where on reflective surface 710 the transmission reflects. Since reflective surface 710 is modeled as an infinite number of small flat surfaces, the likelihood that multiple destinations will receive transmissions reflecting off the curved surface tends towards 0.

In general, the more flat surfaces with large surface area are present in a deployment of a communications system, the more mirror sources with wide radiation sectors are present, thereby leading to high likelihood that many destinations will receive transmissions reflecting off the flat surfaces. In a typical indoor deployment, there are large numbers of such surfaces, including walls, ceilings, roofs, doors, windows, screens, desks, pictures, appliances, furniture, and so on. These surfaces may provide multiple mirror sources that will be receivable by more destinations. Small objects, such as pictures, mirrors, and so forth, may add additional mirror sources while not be significantly large to split a main source with a large radiation sector into smaller radiation sectors.

Figure 8:
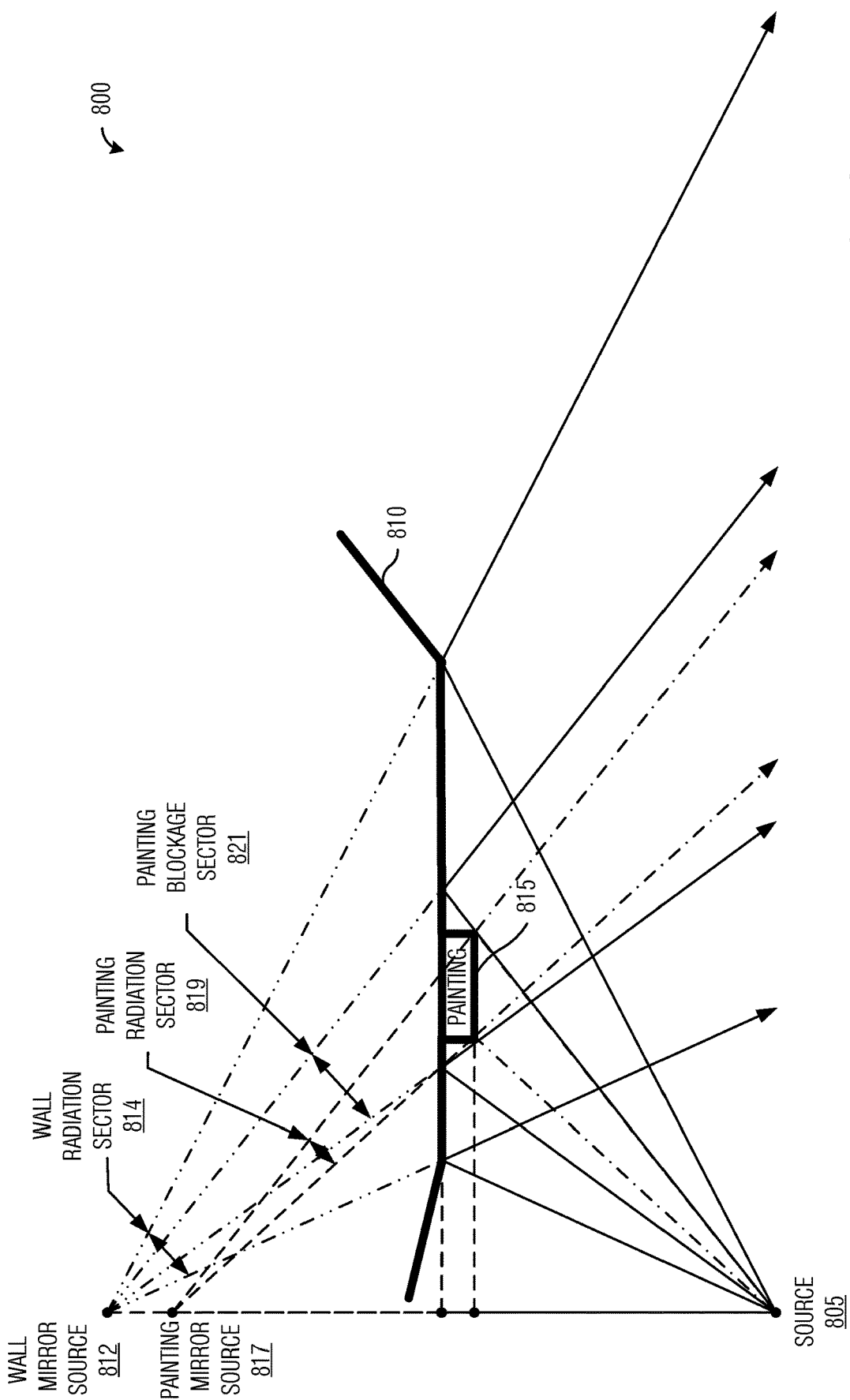
FIG. 8 illustrates an example communications system highlighting the modeling of a transmission following a secondary path with a blockage according to example embodiments described herein.

FIG. 8 illustrates an example communications system 800 highlighting the modeling of a transmission following a secondary path with a blockage. In communications system 800, a transmission originates at main source 805 and reflects off reflective surface 810. On reflective surface 810 is a painting 815. Painting 815 may not be as reflective as reflective surface 810 and may be viewed as a blockage. It is possible to model the transmissions reflecting off reflective surface 810 as originating at a mirror source 812 and transmissions reflecting off painting 815 as originating at mirror source 817. Mirror source 812 has a radiation sector 814 and mirror source 817 has radiation sector 819 and a blockage sector 821.

According to an example embodiment, transmissions are modeled as originating at their main source and destined for mirror sinks instead of originating at mirror sources and arriving at their main sink. Mirror sinks are duals of mirror sources. Mirror sinks are imaginary sinks that correspond to a main sink, relative to a reflective surface. The location of a mirror sink depends upon a geometric relationship between the main sink and the reflective surface. As an example, for a flat reflective surface, the mirror sink is located on an orthogonal line that connects the main source to the flat reflective surface (or an extension of the flat reflective surface), where the mirror sink is equidistant relative to the flat reflective surface as the main sink is to the flat reflective surface, except that the mirror sink is on the opposite side of the flat reflective surface (or the extension thereof).

Figure 9A:
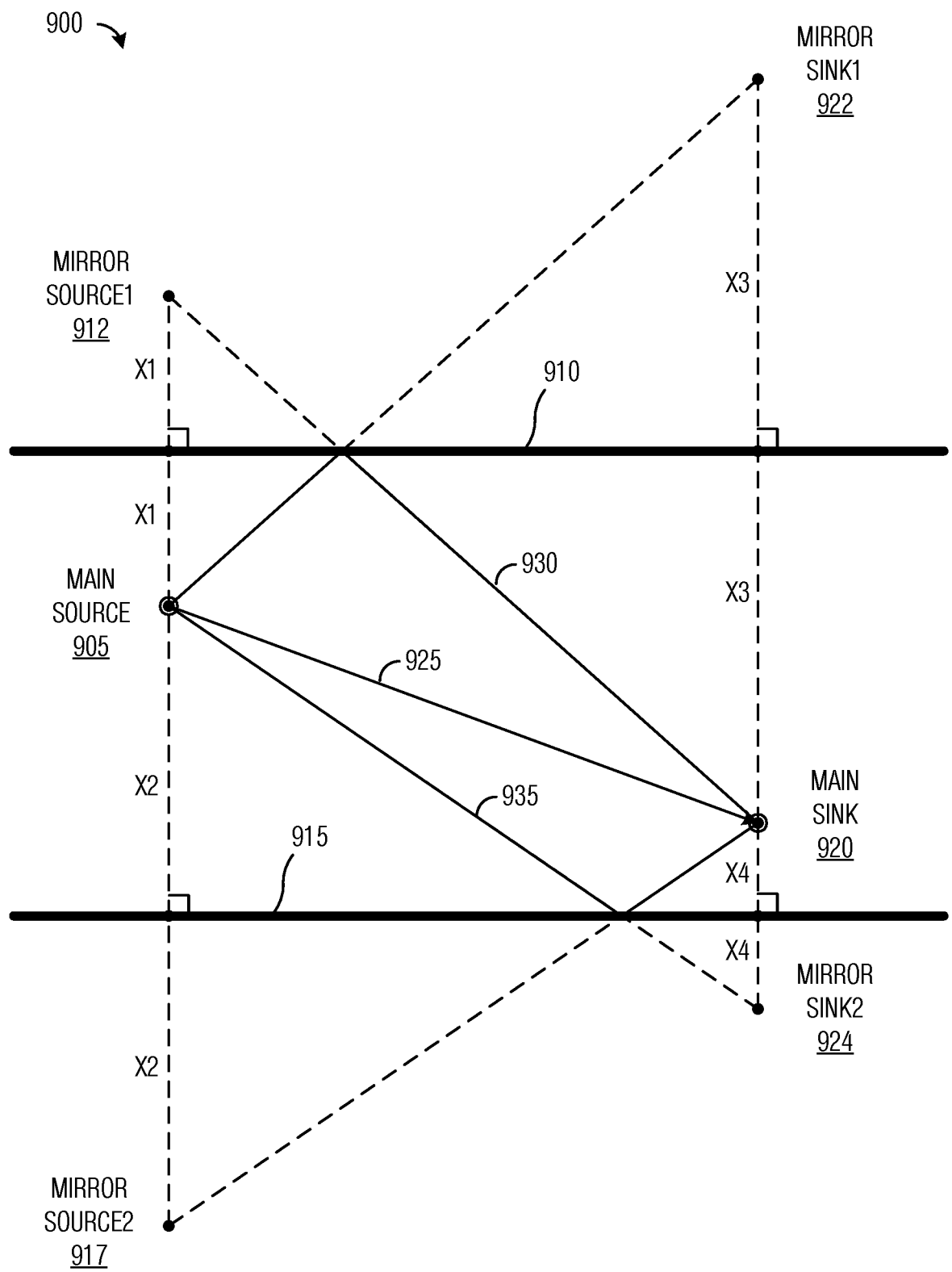
FIG. 9A illustrates an example communications system, highlighting the duality between sources and sinks according to example embodiments described herein.

FIG. 9A illustrates an example communications system 900, highlighting the duality between sources and sinks. Communications system 900 includes a main source 905, a first reflective surface 910, a second reflective surface 915, and a main sink 920. A primary path 925 exists between main source 905 and main sink 920. Furthermore, a first secondary path 930 connecting main source 905 and main sink 920 involves a reflection off first reflective surface 910, while a second secondary path 935 connecting main source 905 and main sink 920 involves a reflection off second reflective surface 915.

First secondary path 930 may be modeled as originating at mirror source1 912 and destined for main sink 920 and second secondary path 935 may be modeled as originating at mirror source 2 917 and destined for main sink 920. As shown in FIG. 9, mirror source1 912 and mirror source2 917 are equidistant from main source 905 relative to the respective reflective surfaces.

Similarly, first secondary path 930 may modeled as originating at main source 905 and destined for mirror sink1 922 and secondary path 935 may be modeled as originating at main source 905 and destined for mirror sink2 924. As shown in FIG. 9, mirror sink1 922 and mirror sink2 924 are equidistant from main sink 920 relative to the respective reflective surfaces.

Figure 9B:
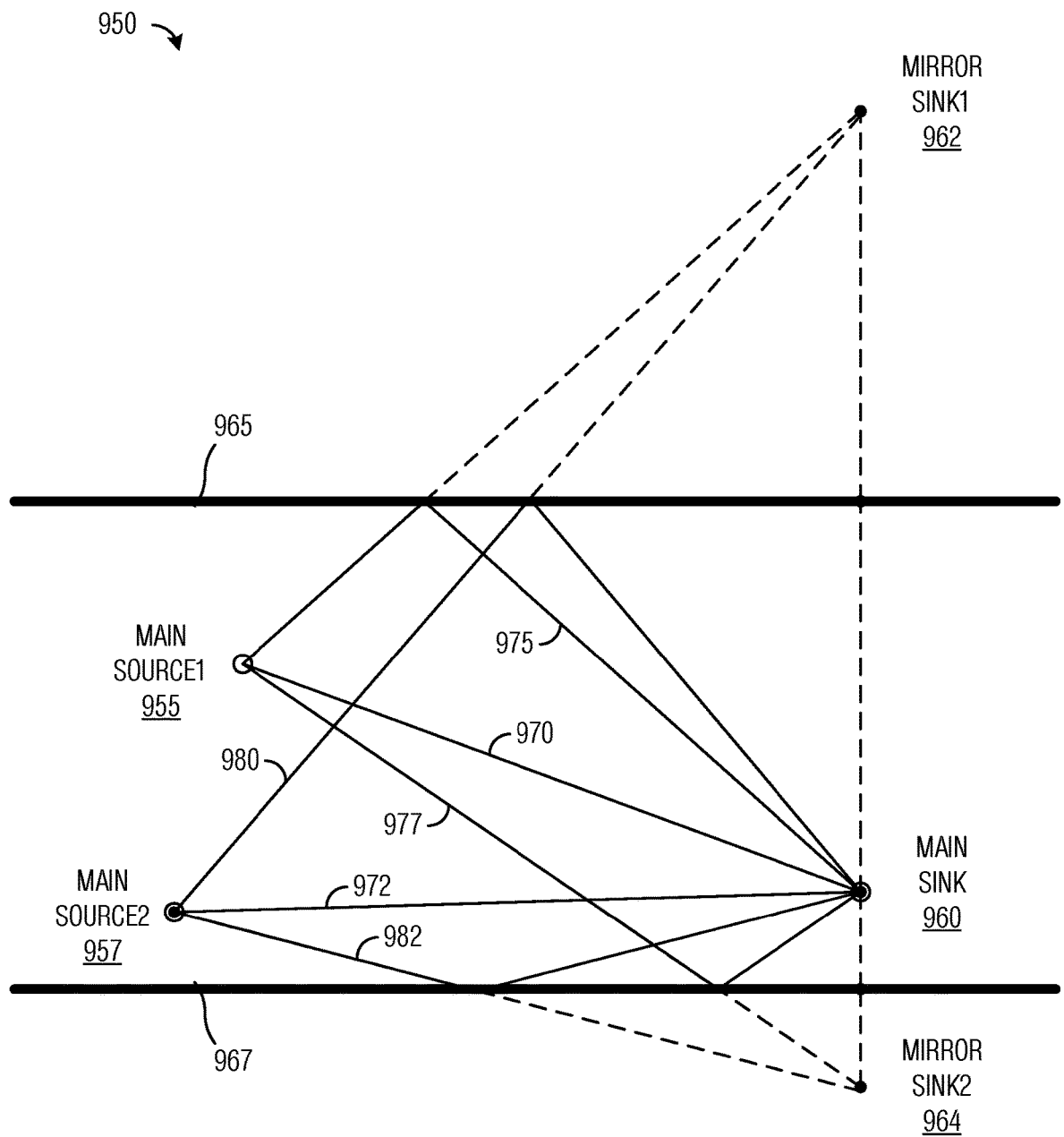
FIG. 9B illustrates an example communications system, highlighting multiple mirror sinks according to example embodiments described herein.

FIG. 9B illustrates an example communications system 950, highlighting multiple mirror sinks. Communications system 950 includes a first main source (main source1) 955 and a second main source (main source2) 957, and a main sink 960. Also shown in FIG. 9B are two mirror sinks, first mirror sink (mirror sink1) 962 and second mirror sink (mirror sink2) 964. The two mirror sinks correspond to orthogonal projections of main sink 960 to a first reflective surface 965 and a second reflective surface 967, respectively.

A first primary path 970 connects first main source 955 to main sink 960 and a second primary path 972 connects second main source 957 to main sink 960. A first secondary path 975 originates at first main source 955 destined for first mirror sink 962 before reflecting off first reflective surface 965 onto main sink 960. A second secondary path 977 originates at first main source 955 destined for second mirror sink 964 before reflecting off second reflective surface 967 onto main sink 960. A third secondary path 980 originates at second main source 957 destined for first mirror sink 962 before reflecting off first reflective surface 965 onto main sink 960. A fourth secondary path 982 originates at second main source 957 destined for second mirror sink 964 before reflecting off second reflective surface 967 onto main sink 960.

Figure 10A:
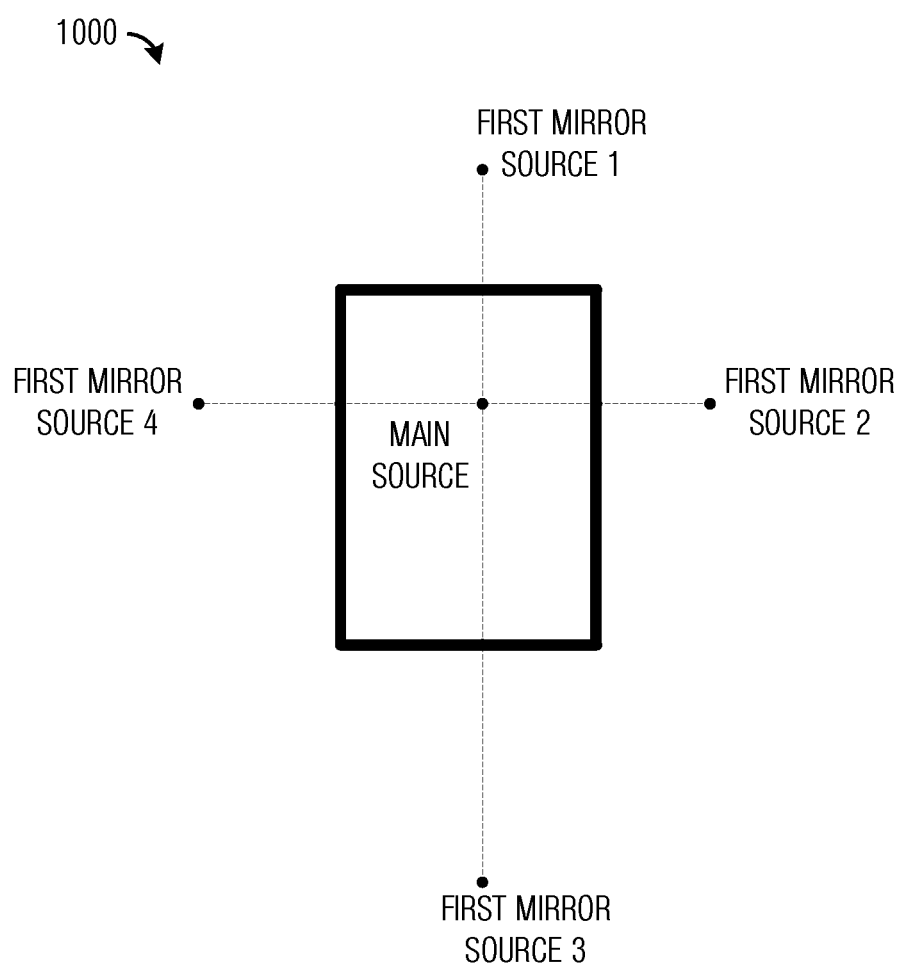
FIGS. 10A and 10B illustrate first order and second order mirror sources corresponding to a main source located in a rectangular room according to example embodiments described herein.
Figure 10B:
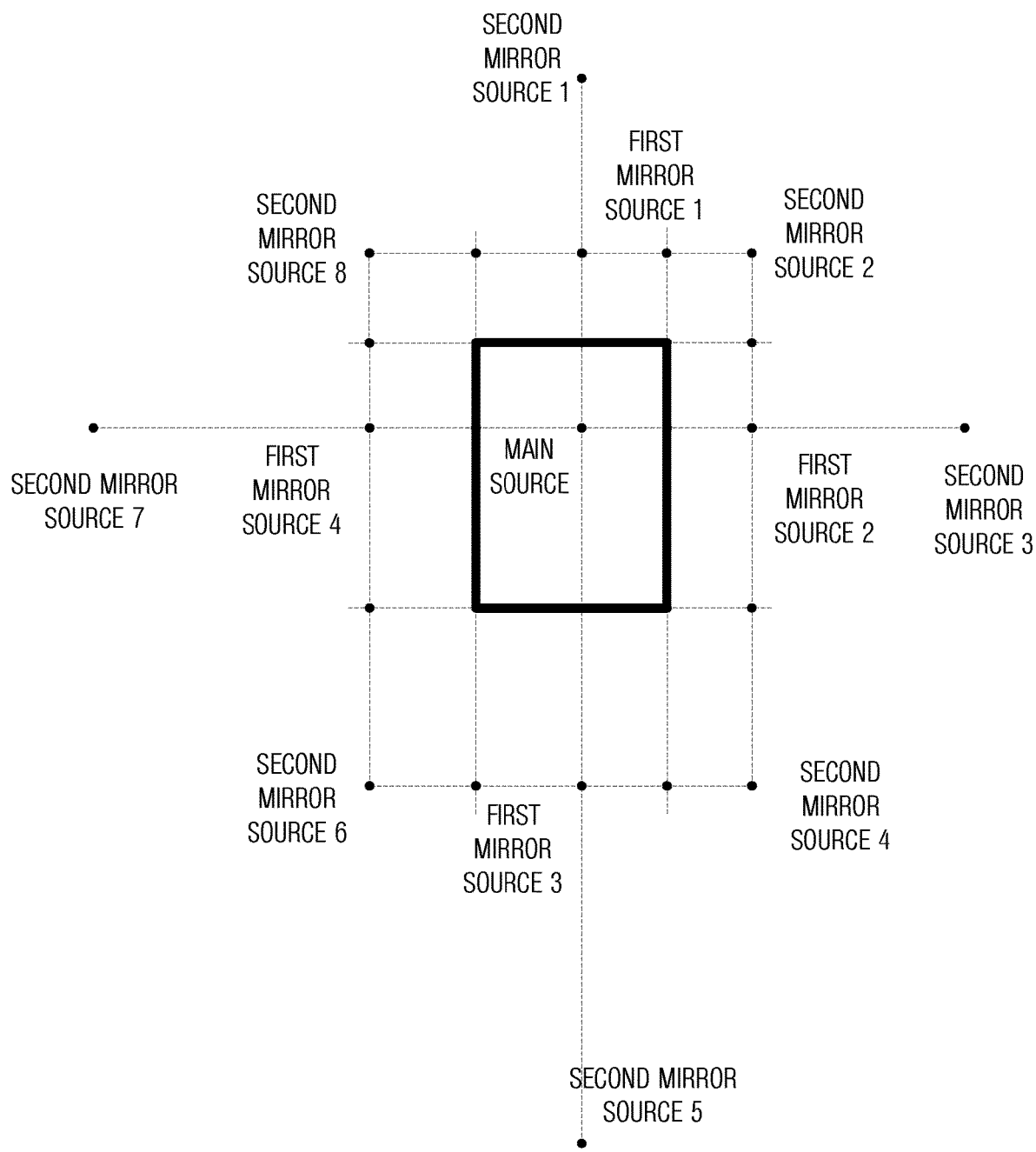

FIG. 10A illustrates a representation 1000 of first order mirror sources corresponding to an example main source located in a rectangular room. As discussed previously, first order mirror sources are reflections of a main source. The first order mirror sources have the energy of the main source reduced by a reflection coefficient of the reflective surface that they reflected off. FIG. 10B illustrates a representation 1050 of second order mirror sources corresponding to an example main source located in a rectangular room. The second order mirror sources are reflections of the first order mirror sources. The second order mirror sources have the energy of the first order mirror source reduced by a reflection coefficient of the reflective surface that they reflected off. Higher order mirror sources are possible until their respective energies become non-negligible. The mirror sources with non-negligible energies are connected and their channel estimated using expression $$H_m = \sum_{k=0}^{K-1} G_k \cdot \exp\left(j \cdot 2 \cdot \pi \cdot \frac{\sqrt{(x_m - x_k)^2 + (y_m - y_k)^2 + (z_m - z_k)^2}}{\lambda}\right),$$

where $G_k$ is the complex amplitude of source k, $(x_m, y_m, z_m)$ is the location of antenna m, and $(x_k, y_k, z_k)$ is the location of source k. A detailed discussion of an example embodiment for estimating the channel is provided below.

It is noted that in a majority of implementations, APs are stationary while UEs are mobile. Therefore it may be possible to determine the locations of the mains and mirrors for stationary devices of a communications system, such as APs, a priori and store the location information in a memory or database for subsequent utilization. Since the stationary devices do not move, once the locations of the mains and mirrors are determined, it is not necessary to update the locations unless physical changes are made to the communications system. Examples of the physical changes may include the addition or removal of APs, AP failure, relocation of APs, the addition or removal of reflective surfaces, and so on. The locations of the mains and mirrors for mobile devices may change rapidly and continually as the mobile devices move about, which may significantly complicate the determination of the locations of the mains and mirrors.

According to an example embodiment, channel estimation at a reception point is performed based on positions of main sources and mirror sources of transmissions received by the reception point. Channel estimation based on the positions of main sources and mirror sources of transmissions received by the reception point simplifies the channel estimation process by eliminating a need for the reception point to receive and process reference signals transmitted over the primary and secondary paths of the multipath between the main source of the transmission and each of the antennas in the antenna array of the reception point. Therefore, the channel estimation complexity is reduced. Additionally, the amount of information stored regarding the estimated channels based on the positions of the main sources and mirror sources of the transmissions is less than the amount of information stored when channel estimation is derived from the processing of received reference signals. Hence, the channel estimates storage and/or communications overhead (such as when the channel estimates are communicated) is reduced.

Figures 11A, 11B:
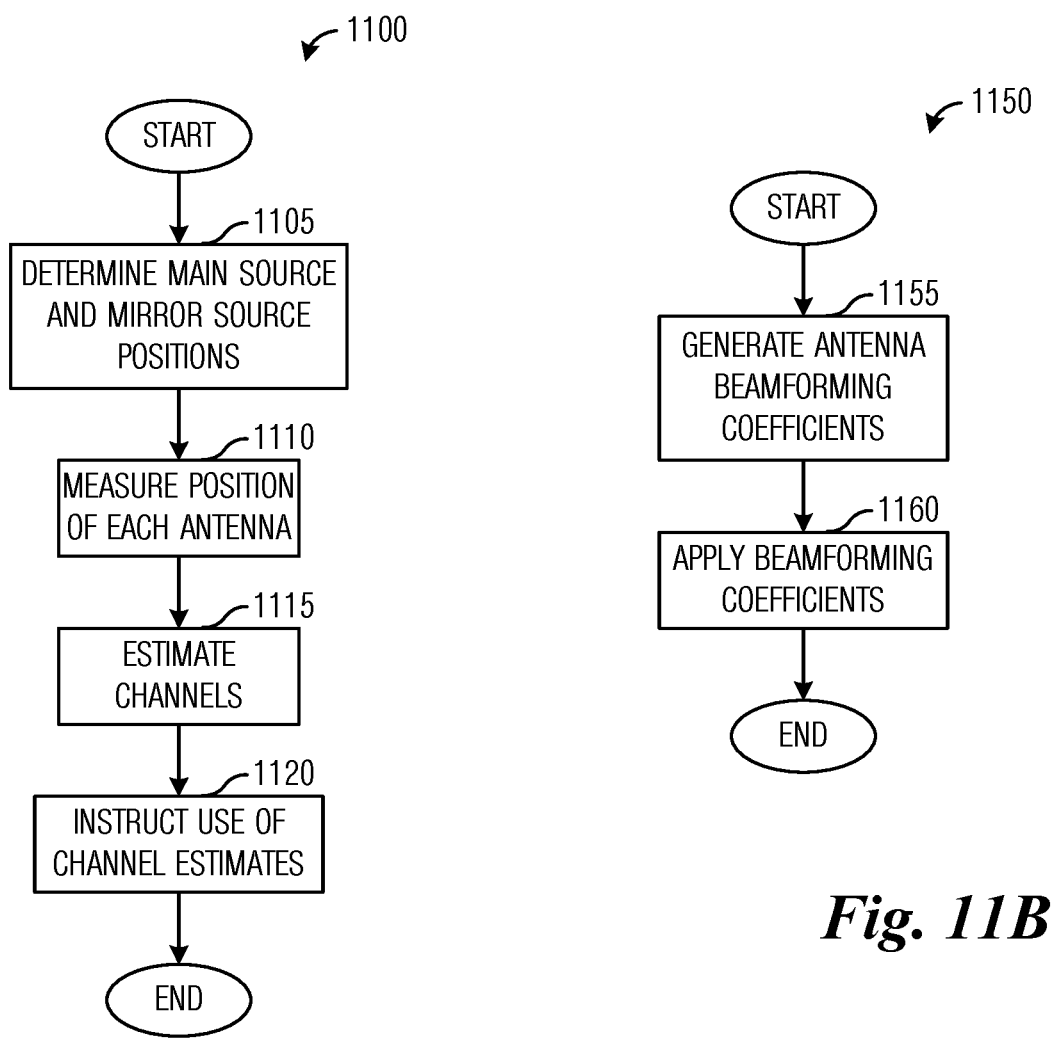
FIG. 11A illustrates a flow diagram of example operations occurring in a communications device with an antenna array according to example embodiments described herein.
FIG. 11B illustrates a flow diagram of example operations occurring in instructing the use of the channel estimates according to example embodiments described herein.

FIG. 11A illustrates a flow diagram of example operations 1100 occurring in a communications device with an antenna array. Operations 1100 may be indicative of operations occurring in a communications device, such as a transmission point and/or a reception point, with an antenna array as the communications device communicates with other communications devices.

Operations 1100 begin with the communications device determining positions of main sources and/or mirror sources of transmissions received by the communications device (block 1105). The positions of the main sources of the transmissions received by the communications device may be provided to the communications device by the main sources themselves. As an illustrative example, the main sources may include positioning units that use a positioning system, such as the Global Positioning System (GPS) or a positioning system that determines the position based on orthogonal reference signals, to determine the positions. The main sources may signal their positions to the communications device. Alternatively, the positions of the main sources of the transmissions may be provided by the communications system. The communications system may be able to determine the positions of the main sources from the transmissions of the main sources and provide the positions of the main sources to the communications device.

The communications device may determine positions of the mirror sources from the positions of the main sources and from physical environmental deployment (PED) information regarding the physical layout of the environment in which the communications device and the main sources are deployed. The PED information may include information about number and type (such as reflective or absorptive properties, penetration properties, and so on) of surfaces that reflect or absorb electromagnetic beams (such as walls, doors, ceilings, floors, and so forth), significant objects that reflect or absorb electromagnetic beams (such as large furniture pieces, large appliances, large mirrors, filing cabinets, computer servers, large televisions, and so on), less significant objects that reflect or absorb electromagnetic beams (such as small furniture pieces, art pieces, small appliances, small computers, displays, small televisions, printers, scanners, copiers, and the like), and the like. The PED information may also include information related to an extent of signal coverage since the extent of signal coverage has a role in determining which reception point sees which mirror source. A detailed discussion of an example technique for determining the positions of main sources and mirror sources is provided below.

The communications device measures the positions of the antennas in its antenna array (block 1110). The antennas in the antenna array may include positioning units that are capable of determining the position of individual antennas autonomously. The positioning units may use a positioning system, such as GPS, to determine the positions of the antennas. The positioning units may use a positioning system that transmits orthogonal reference signals to determine the position of the antennas. A detailed discussion of example techniques for determining the positions of the antennas of the antenna array is provided in a co-assigned U.S. patent application Ser. No. 14/932,849, filed Nov. 4, 2015, entitled "System and Method for Large Scale Multiple Input Multiple Output Beamforming", which is hereby incorporated herein by reference.

The communications device estimates channels between the main sources and/or mirror sources and the antennas in the antenna array (block 1115). The estimates of the channels may include estimates of primary channels (channels between main sources and the antennas in the antenna array) as well as estimates of secondary channels (channels between mirror sources and the antennas in the antenna array). As an illustrative example, the channel estimates are in the form of channel gains. In a general situation, the P antennas in the antenna array may be located at a set of coordinates $(x, y, z)_p$, where P is the number of antennas in the antenna array and p is the p-th antenna in the antenna array. Hence, the antennas in the antenna array do not necessarily have to be planar nor do they have to be uniformly spaced. In order to determine the coefficients for the antennas for a main source (or mirror source) at direction $(\alpha, \beta)$, where the direction $(\alpha, \beta)$ may be derived from the position of the main sources and mirror sources and the positions of the antennas in the antenna array. The coordinates of the target are expressible as $$x_T = R \cdot \cos(\alpha) \cdot \cos(\beta),$$

$$y_T = R \cdot \cos(\alpha) \cdot \sin(\beta),$$

$$z_T = R \cdot \sin(\alpha),$$

where R the distance between antenna p and source T and is at least an order of magnitude greater than $\sqrt{x_p^2 + y_p^2 + z_p^2}$ for any antenna p. It may be shown that the complex gain of each antenna p is expressible as $$H_p(\alpha, \beta) = \exp\left(j \cdot 2 \cdot \pi \cdot \frac{\sqrt{(x_p - x_T)^2 + (y_p - y_T)^2 + (z_p - z_T)^2}}{\lambda}\right),$$

which may be normalized as $$\overline{H}_p(\alpha, \beta) = \lim_{R \to \infty}\left(\frac{H_p(\alpha, \beta)}{H_0(\alpha, \beta)}\right).$$

It can also be shown that $\overline{H}_p(\alpha, \beta)$ converges to a projection of unit vector $(\alpha, \beta)$ upon vector $(x_p - x_0, y_p - y_0, z_p - z_0)$, which is expressible as $$\overline{H}_p(\alpha, \beta) = \exp\left(j \cdot 2 \cdot \pi \cdot \frac{(x_p - x_0) \cdot \cos(\alpha) \cdot \cos(\beta) + (y_p - y_0) \cdot \cos(\alpha) \cdot \sin(\beta) + (z_p - z_0) \cdot \sin(\alpha)}{\lambda}\right).$$

Therefore, the channel for antenna m located at $(x_m, y_m, z_m)$ is expressible as $$H_m = \sum_{k=0}^{K-1} G_k \cdot \exp\left(j \cdot 2 \cdot \pi \cdot \frac{x_m \cdot \cos(\alpha_k) \cdot \cos(\beta_k) + y_m \cdot \cos(\alpha_k) \cdot \sin(\beta_k) + z_m \cdot \sin(\alpha_k)}{\lambda}\right)$$

where $G_k$ is the complex amplitude of beam k and antenna 0 is located at reference point $(x_0, y_0, z_0)$, and $\lambda$ is the wavelength of the carrier frequency.

A received sample of antenna m at time t is expressible as $$Y_m(t) = H_m \cdot D(t) + \text{Noise}_m(t),$$

where $\text{Noise}_m(t)$ is the thermal noise of antenna m at time t, and $D(t)$ is the data symbol at time t, which also can be re-written as $$Y_m(t) = \sum_{k=0}^{K-1} G_k \cdot \exp\left(j \cdot 2 \cdot \pi \cdot \frac{x_m \cdot \cos(\alpha_k) \cdot \cos(\beta_k) + y_m \cdot \cos(\alpha_k) \cdot \sin(\beta_k) + z_m \cdot \sin(\alpha_k)}{\lambda}\right) \cdot D(t) + \text{Noise}_m(t).$$

Using multi-beam maximum ratio combining (MRC) decoding, an output at time t of a MRC decoder is expressible as $$R(t) = \frac{1}{\sum_{m=0}^{M-1} |H_m|^2} \cdot \sum_{m=0}^{M-1} \text{conj}(H_m) \cdot Y_m(t) = D(t) + \text{Noise}(t),$$

which also can be re-written as $$R(t) = \frac{1}{\sum_{k=0}^{K-1} G_k^2} \cdot \sum_{k=0}^{K-1} \text{conj}(G_k) \cdot R_k(t, \alpha_k, \beta_k),$$

where $R_k(t, \alpha_k, \beta_k)$ is the MRC decoder output for beam k at time t, which is expressible as $$R_k(t, \alpha_k, \beta_k) = \frac{1}{M} \cdot \sum_{m=0}^{M-1} \exp\left(\frac{-j \cdot 2 \cdot \pi \cdot x_m \cdot \cos(\alpha_k) \cdot \cos(\beta_k) + y_m \cdot \cos(\alpha_k) \cdot \sin(\beta_k) + z_m \cdot \sin(\alpha_k)}{\lambda}\right) \cdot Y_m(t).$$

Utilizing the expressions for $R_k(t, \alpha_k, \beta_k)$ and $Y_m(t)$ above, and since the beams are orthogonal to each other, it may be shown that the MRC decoder output for beam k at time t is approximately equal to the data symbol at time t multiplied by the complex amplitude of beam k: $R_k(t, \alpha_k, \beta_k) \approx G_k \cdot D(t)$. Suppose that the pilot sequence of length N is known (i.e., $D(t) = PLT(t)$ For $(0 \le t < N)$), then the Least Mean Squared (LMS) complex gain estimation is expressible as $$\hat{G}_k = \frac{1}{N} \cdot \sum_{n=0}^{N-1} R_k(n, \alpha_k, \beta_k) \cdot PLT(n) \approx G_k.$$

The expression for $H_p(\alpha, \beta)$ and $\overline{H}_p(\alpha, \beta)$ above shows that it is possible to tune the antenna array with antennas at coordinates $(x, y, z)_p$ in space $(x, y, z)$ to transmit and/or receive signals to and/or from direction $(\alpha, \beta)$ may be configured with coefficients that match the complex gain $H_p^*(\alpha, \beta)$. The communications device instructs use of the channel estimates (block 1120). Instructing use of the channel estimates may include storing the channel estimates, indicating the channel estimates to other communications devices, providing the channel estimates or values derived from the channel estimates to the antenna array, deriving information (such as antenna beamforming coefficients) from the channel estimates, and so on.

FIG. 11B illustrates a flow diagram of example operations 1150 occurring in instructing the use of the channel estimates. Operations 1150 may be indicative of operations occurring in a communications device, such as a transmission point and/or a reception point, with an antenna array as the communications device instructs the use of the channel estimates.

The communications device generates the beamforming coefficients for the antennas in the antenna array in accordance with the channel estimates (block 1155). The communications device applies the beamforming coefficients (block 1160). The communications device may provide the beamforming coefficients to corresponding antennas in the antenna array.

According to an example embodiment, channel estimation at a transmission point is performed based on positions of main sinks and mirror sinks of transmissions made by the transmission point. Channel estimation based on the positions of main sinks and mirror sinks of transmissions made by the transmission point simplifies the channel estimation process by eliminating a need for the transmission point to receive and process reference signals transmitted over the primary and secondary paths of the multipath between each of the antennas in the antenna array of the main sink and the transmission point or vice versa. Therefore, the channel estimation complexity is reduced. Additionally, the amount of information stored regarding the estimated channels based on the positions of the main sinks and mirror sinks of the transmissions is less than the amount of information stored when channel estimation is derived from the processing of received reference signals. Hence, the channel estimates storage and/or communications overhead (such as when the channel estimates are communicated) is reduced.

Figure 12:
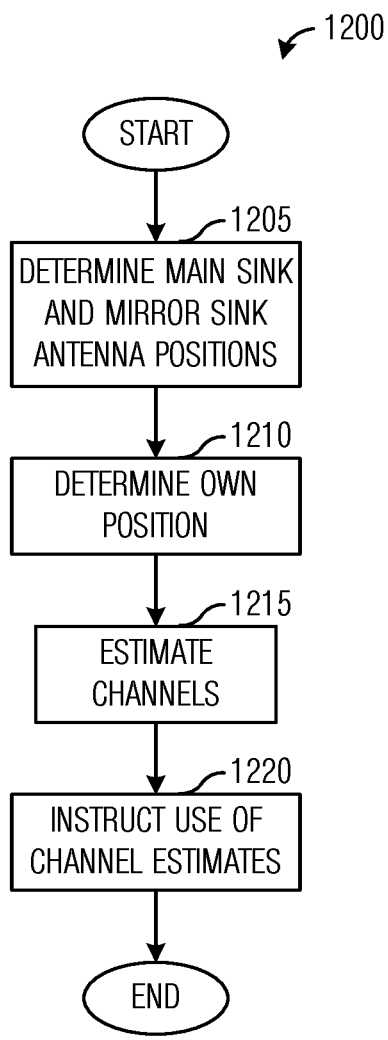
FIG. 12 illustrates a flow diagram of example operations occurring in a communications device according to example embodiments described herein.

FIG. 12 illustrates a flow diagram of example operations 1200 occurring in a communications device. Operations 1200 may be indicative of operations occurring in a communications device, such as a transmission point and/or a reception point, as the communications device communicates with other communications devices.

Operations 1200 begin with the communications device determining positions of main sinks and/or mirror sinks of transmissions made by the communications device (block 1205). The positions of the main sinks and/or mirror sinks may be retrieved from a memory or a database. In situations where the main sinks are stationary, the positions of the main sinks and the mirror sinks may be determined a priori and stored in a memory or a database. The positions of the main sinks and the mirror sinks may be updated when a physical change occurs in the communications system.

Alternatively, the positions of the main sinks of the transmissions made by the communications device may be provided to the communications device by the main sinks themselves. As an illustrative example, the main sinks may include positioning units that use a positioning system, such as the Global Positioning System (GPS) or a positioning system that determines the position based on orthogonal reference signals, to determine the positions. The main sinks may signal their positions to the communications device. Alternatively, the positions of the main sinks of the transmissions may be provided by the communications system. The communications system may be able to determine the positions of the main sinks from the transmissions of the main sources and provide the positions of the main sinks to the communications device.

The communications device may determine positions of the mirror sinks from the positions of the main sinks and from PED information regarding the physical layout of the environment in which the communications device and the main sinks are deployed. The PED information may include information about number and type (such as reflective or absorptive properties, penetration properties, and so on) of surfaces that reflect or absorb electromagnetic beams (such as walls, doors, ceilings, floors, and so forth), significant objects that reflect or absorb electromagnetic beams (such as large furniture pieces, large appliances, large mirrors, filing cabinets, computer servers, large televisions, and so on), less significant objects that reflect or absorb electromagnetic beams (such as small furniture pieces, art pieces, small appliances, small computers, displays, small televisions, printers, scanners, copiers, and the like), and the like. The PED information may also include information related to an extent of signal coverage since the extent of signal coverage has a role in determining which reception point sees which mirror source. A detailed discussion of an example technique for determining the positions of main sources and mirror sources is provided below.

The communications device determines its own position (block 1210). The communications device may determine its own position using a positioning system such as those described previously. The communications device estimates channels between itself and the antennas of main sinks and/or mirror sinks (block 1215). The estimates of the channels may include estimates of primary channels (channels between the communications device and the antennas of the main sinks) as well as estimates of secondary channels (channels between the communications device and the antennas of the mirror sinks). As an illustrative example, the channel estimates are in the form of channel gains.

In a general situation, a location of an antenna m of a sink (main or mirror) k is expressible as $(x_{m,k}, y_{m,k}, z_{m,k})$ with $G_{m,k}$ being the complex gain for a channel from a main source to antenna m of sink k, where (x, y, z) are axis coordinates and m and k are integer values. Given that the location of a main source is expressible as $(x, y, z)_{source}$, the channel between the main source and antenna m of sink k is expressible as:

$$H_m = \sum_{k=0}^{K-1} G_{m,k} \cdot \exp\left(j \cdot 2 \cdot \pi \cdot \frac{\sqrt{(x_{m,k} - x)^2 + (y_{m,k} - y)^2 + (z_{m,k} - z)^2}}{\lambda}\right),$$

where $\lambda$ is the wavelength of the carrier frequency.

The communications device instructs use of the channel estimates (block 1220). Instructing use of the channel estimates may include storing the channel estimates, indicating the channel estimates to other communications devices, providing the channel estimates or values derived from the channel estimates to the antenna array, deriving information (such as antenna beamforming coefficients) from the channel estimates, and so on.

According to an example embodiment, the positions of the mirrors (sources and/or sinks) are determined from positional information of the mains (sources and/or mirrors) and PED information. The positions of the mirrors may be determined from the positional information of the mains and the PED information using simple geometric relationships. If there are multiple mains, the positions of mirrors for each main may be separately determined.

Figure 13:
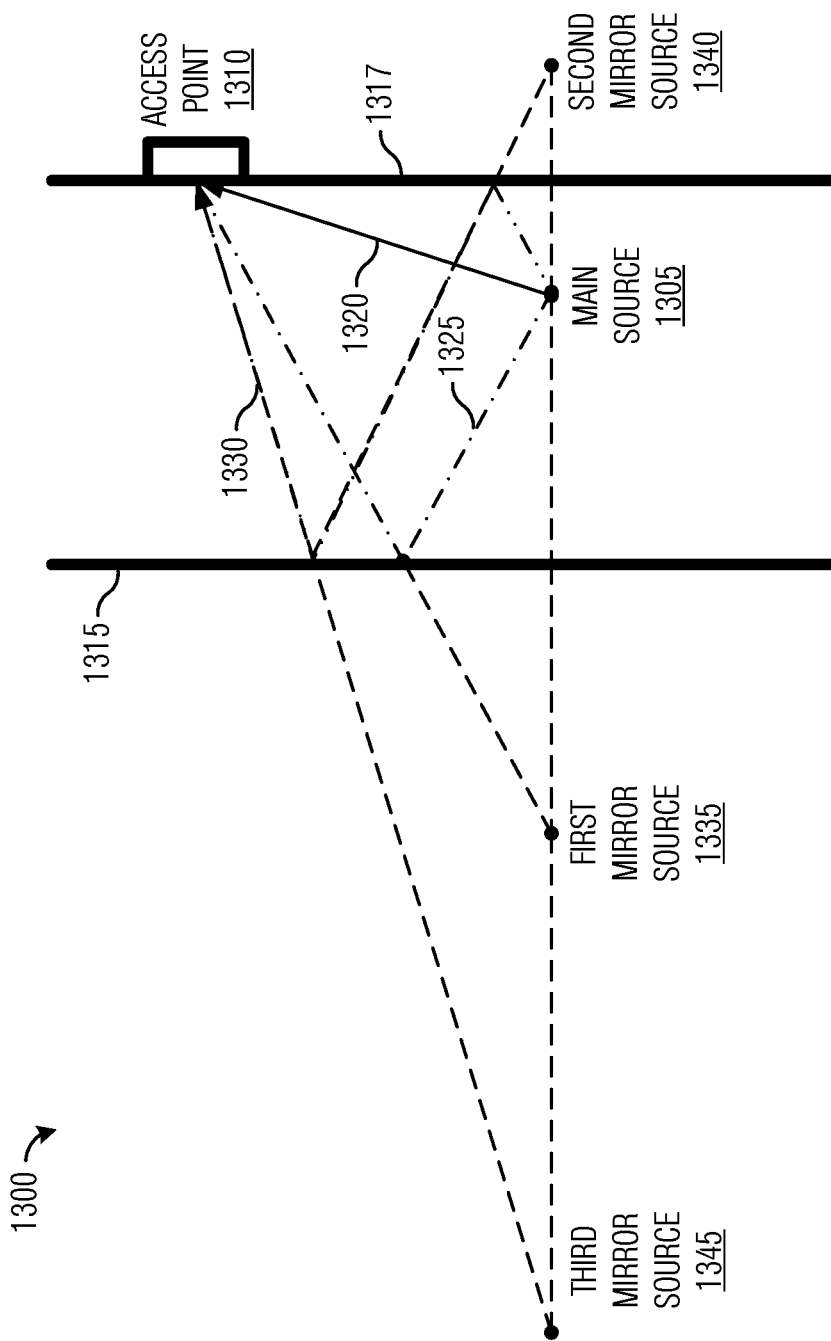
FIG. 13 illustrates an example communications system, highlighting primary and secondary paths and associated mirror sources according to example embodiments described herein.

FIG. 13 illustrates an example communications system 1300, highlighting primary and secondary paths and associated mirror sources. Communications system 1300 includes communicating devices, main source 1305 and an AP 1310. As shown in FIG. 13, main source 1305 is making an uplink transmission to AP 1310. In other words, main source 1305 is the transmission point and AP 1310 is the reception point. Communications system 1300 is deployed in between a first wall 1315 and a second wall 1317. As an example, communications system 1300 is deployed indoors.

When main source 1305 sends a transmission to AP 1310, the transmission may follow a primary path 1320. The transmission may also follow several secondary paths, such as first secondary path 1325 where the transmission reflects off first wall 1315 before arriving at AP 1310, or a second secondary path 1330 where the transmission reflects off second wall 1317 and first wall 1315 before arriving at AP 1310. First secondary path 1325 reflects off a single wall, so there is a single mirror source associated with first secondary path 1325, which is shown in FIG. 13 as first reflected source 1335. Second secondary path 1330 reflects off two walls, so there are two mirror sources associated with second secondary path 1330, which are shown in FIG. 13 as second mirror source 1340 and third mirror source 1345.

Figure 14:
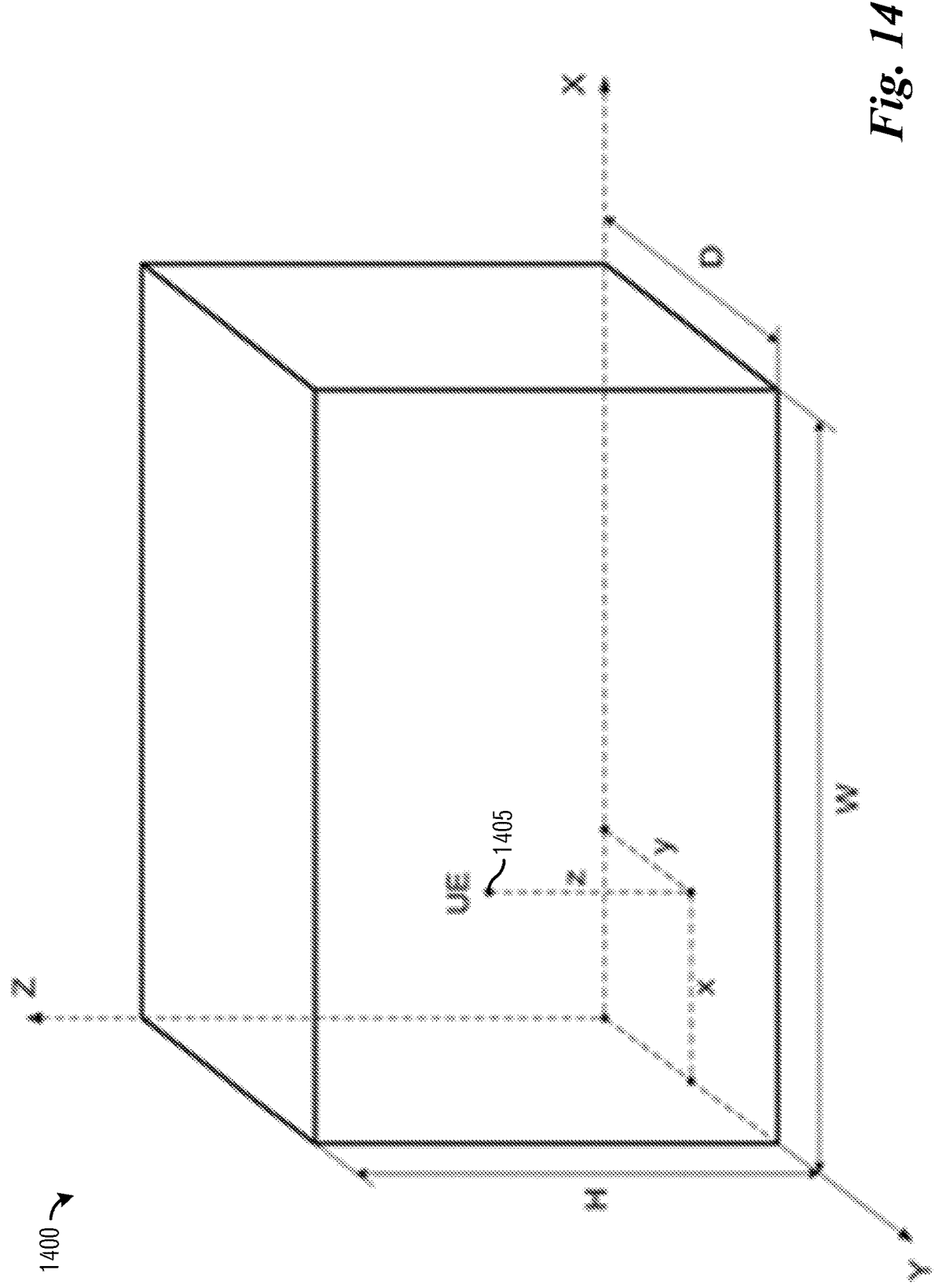
FIG. 14 illustrates a diagram of a model for a rectangular room according to example embodiments described herein.

FIG. 14 illustrates a diagram of a model for a rectangular room 1400. As shown in FIG. 14, rectangular room 1400 has dimensions (W, D, H). Interior to rectangular room 1400 is a UE 1405 located at coordinates $(x_0, y_0, z_0)$. UE 1405 is considered to be the main source and as stated previously, is located at coordinates $(x_0, y_0, z_0)$.

It can be shown through basic geometric relationships that there are 6 mirror sources that correspond to one reflection secondary paths (these particular mirror sources may be referred to as first-order reflection mirror sources). The 6 first-order reflection mirror sources are located at coordinates:

$(-x_0, y_0, z_0), (2 \cdot W - x_0, y_0, z_0)$ $(x_0, -y_0, z_0), (x_0, 2 \cdot D - y_0, z_0)$ $(x_0, y_0, -z_0), (x_0, y_0, 2 \cdot H - z_0).$ Furthermore, there are 6·(6−1) second-order reflection mirror sources, which are mirror sources corresponding to second-order reflections of the secondary paths. Additionally, there are 6·(6−1)$^2$ third-order reflection mirror sources, which are mirror sources corresponding to third-order reflections of the secondary paths. In general, there are 6·(6−1)$^{(n-1)}$ n-th-order reflection mirror sources. In other words, the main source has 6 mirror sources (corresponding to the 4 walls, the ceiling, and the floor of rectangular room 1400) and each of the mirror sources has (6−1=5) mirror sources of their own, and so on.

Figure 15:
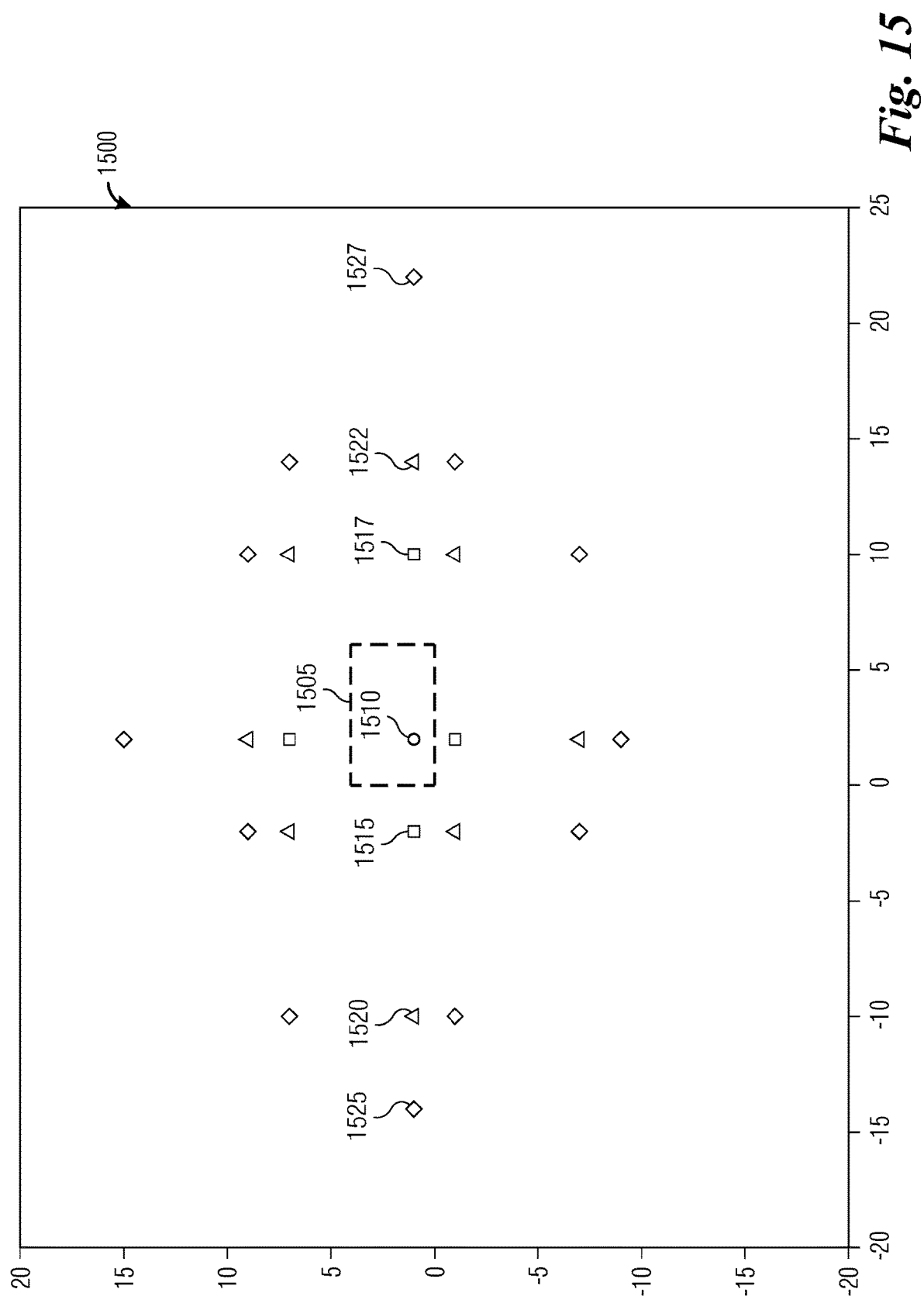
FIG. 15 illustrates a two-dimensional view of rectangular room shown in FIG. 14, highlighting the positions of main sources and mirror sources according to example embodiments described herein.

FIG. 15 illustrates a two-dimensional view of rectangular room 1400 shown in FIG. 14, highlighting the positions of main sources and mirror sources. The two-dimensional view of rectangular room 1400 may be a top-down or bottom-up view of rectangular room 1400. Alternatively, if rectangular room 1400 had a ceiling and a floor formed from radiation absorbing material, the rectangular room 1400 may be viewed as a two-dimensional room.

As shown in FIG. 15 a main source 1510 is positioned inside rectangular room 1400. Main source 1510 has 4 first-order reflection mirror sources, such as first-order reflection mirror sources 1515 and 1517, and 8 second-order reflection mirror sources, such as second-order reflection mirror sources 1520 and 1522, and 12 third-order reflection mirror sources, such as third-order reflection mirror sources 1525 and 1527.

A portion of the energy present in the electromagnetic beam is absorbed by the reflection surface. Furthermore, there are also propagation losses. Therefore, the energy of the mirror sources decrease as the number of reflections increase. Eventually, the energy of the higher order mirror sources approach zero. Hence, the number of significant mirror sources is finite. As an illustrative example, a number of significant mirror sources is equal to the number of mirror sources wherein an accumulation of the energy levels of the mirror sources meets a threshold (e.g., 90%) of the total signal energy.

According to an example embodiment, information relating communications devices (e.g., access points) to main sources and/or mirror sources are generated to simplify communications device and source relationships. As an illustrative example, information relating communications devices to main sources and/or mirror sources are presented in tabular form with a first value indicating that the communications device can receive from the main source and/or mirror source and a second value indicating that the communications device cannot receive from the main source and/or mirror source.

According to an example embodiment, information relating communications devices (e.g., UEs) to main sinks and/or mirror sinks are generated to simplify communications device and sink relationships. As an illustrative example, information relating communications devices to main sinks and/or mirror sinks are presented in tabular form with a first value indicating that the communications device can transmit to the main sink and/or mirror sink and a second value indicating that the communications device cannot transmit to the main sink and/or mirror sink.

Figure 16:
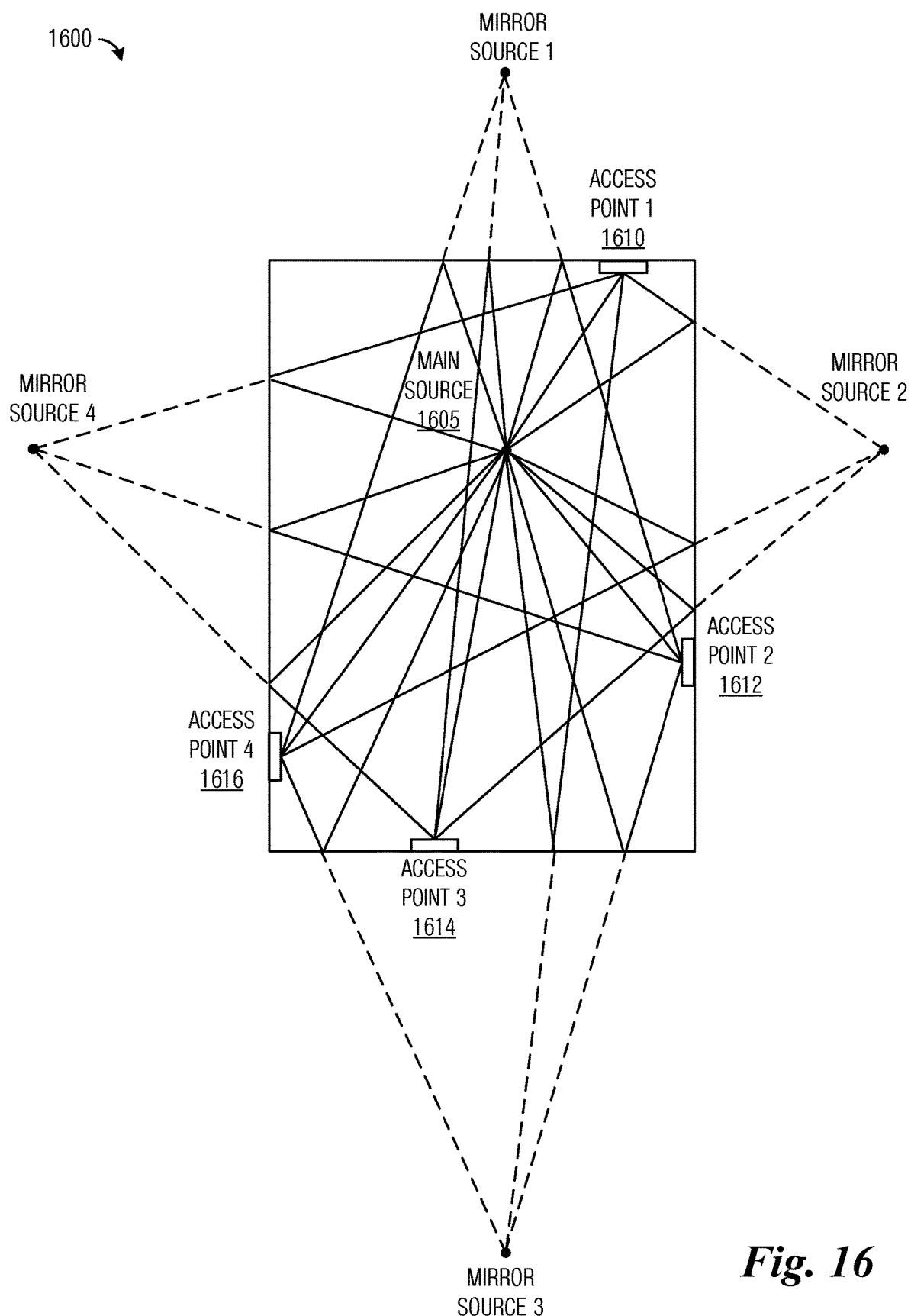
FIG. 16 illustrates a first example deployment of communications system according to example embodiments described herein.

FIG. 16 illustrates a first example deployment of communications system 1600. Communications system 1600 is deployed in an ideal rectangular shaped room with radiation absorbing materials in the ceiling and floor of the room. A main source 1605 is deployed in the room and four access points (access point 1 1610, access point 2 1612, access point 3 1614, and access point 4 1616) are positioned along the walls of the room. Table 1 provides information relating communications devices (APs) to main sources and/or mirror sources in a deployment as shown in FIG. 16, where a "+" indicates that an AP is able to receive a signal from main source 1605 or a mirror source and a "−" indicates that an AP is unable to receive a signal from main source 1605 or a mirror source. Additionally, only first reflection mirror sources are considered.

TABLE 1

APs and sources in ideal rectangular room.

|  | AP 1 | AP 2 | AP 3 | AP 4 |
|---|---|---|---|---|
| Main source | + | + | + | + |
| Mirror Source # 1 | − | + | + | + |
| Mirror Source # 2 | + | − | + | + |
| Mirror Source # 3 | + | + | − | + |
| Mirror Source # 4 | + | + | + | − |

Figure 17B:
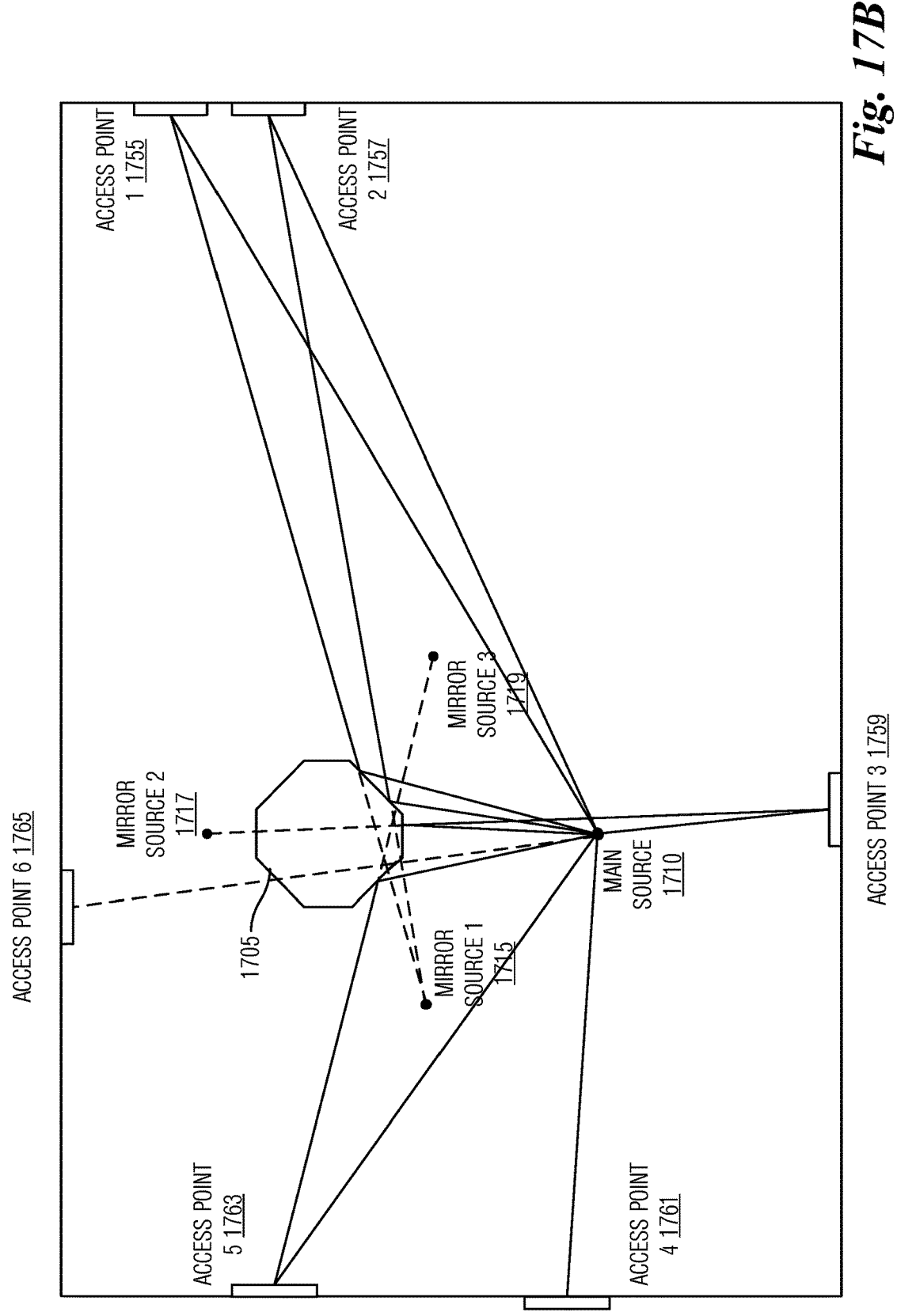
FIG. 17B illustrates access point deployment in communications system of FIG. 17A according to example embodiments described herein.

FIG. 17A illustrates a second example deployment of communications system 1700. Communications system 1700 is deployed in an ideal rectangular shaped room with radiation absorbing materials in the ceiling, floor, and walls. The room includes a reflective column 1705. Therefore the only reflections are coming from reflective column 1705. A main source 1710 is deployed in the room and six access points (not shown) are positioned along the walls of the room. Reflective column 1705 results in a dead zone 1725. However, reflective column 1705 also results in reflective areas, such as mirror 1 reflective area 1730, mirror 2 reflective area 1732, and mirror 3 reflective area 1734. FIG. 17B illustrates access point deployment in communications system 1700 of FIG. 17A. Communications system 1700 includes 6 access points (access point 1 1755, access point 2 1757, access point 3 1759, access point 4 1761, access point 5 1763, and access point 6 1765) positioned along the walls of the room. Table 2 provides information relating communications devices to main sources and/or mirror sources in a deployment as shown in FIGS. 17A and 17B, where a "+" indicates that an AP is able to receive a signal from main source 1710 or a mirror source and a "−" indicates that an AP is unable to receive a signal from main source 1710 or a mirror source. Only first reflection mirror sources are considered.

TABLE 2

APs and sources in ideal rectangular room with reflective column.

|  | AP 1 | AP 2 | AP 3 | AP 4 | AP 5 | AP 6 |
|---|---|---|---|---|---|---|
| Main Source | + | + | + | + | + | − |
| Mirror Source # 1 | + | + | − | − | − | − |
| Mirror Source # 2 | − | − | + | − | − | − |
| Mirror Source # 3 | − | − | − | − | + | − |

Figure 18A:
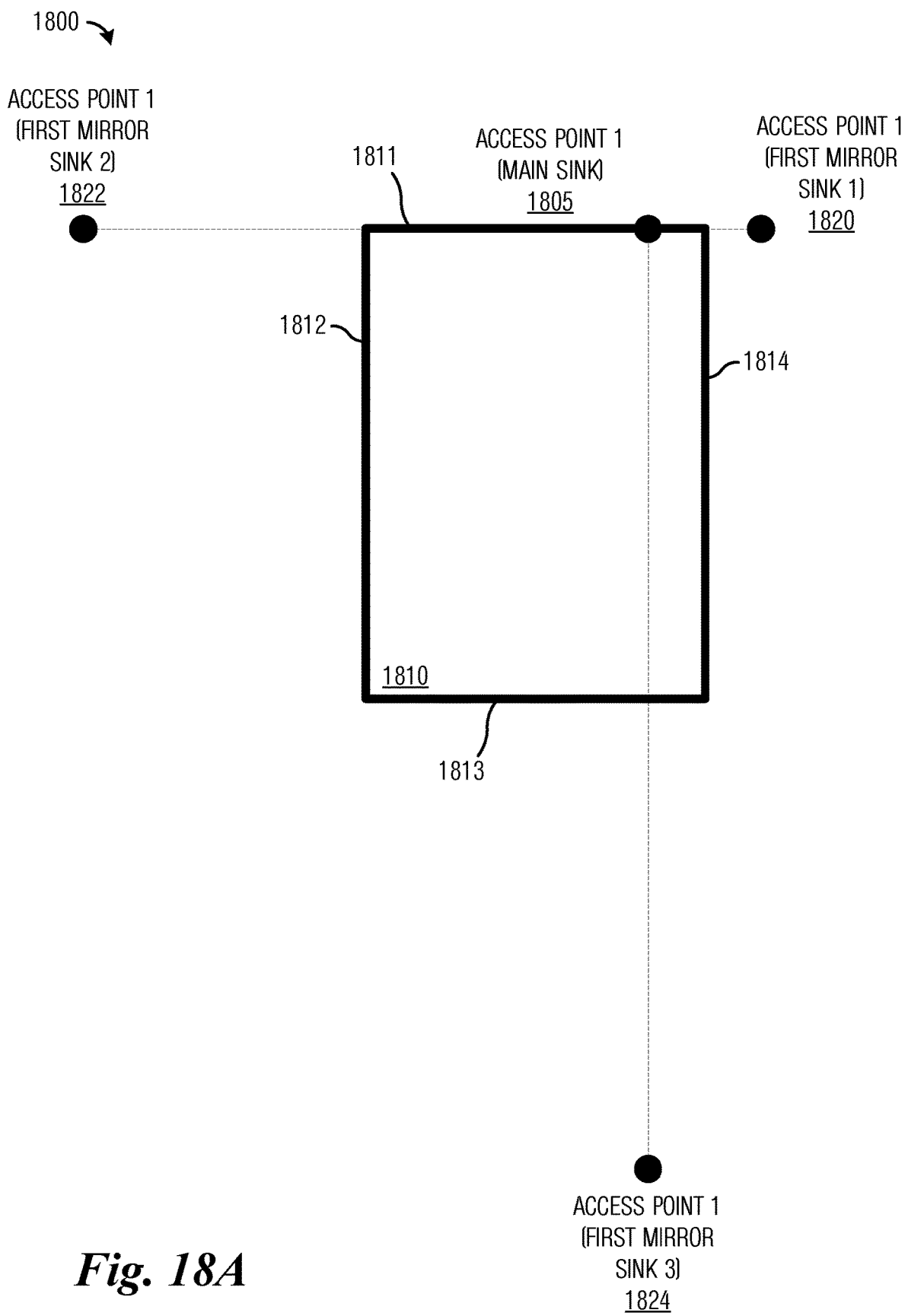
FIG. 18A illustrates an example communications system highlighting main and mirror sinks according to example embodiments described herein.

FIG. 18A illustrates an example communications system 1800 highlighting main and mirror sinks. Communications system 1800 includes a main sink 1805 deployed in a room 1810. Room 1810 includes four walls with reflective surfaces 1811-1814. A first mirror sink 1820 is equidistant to main sink 1805 with respect to wall 1814. A second mirror sink 1822 is equidistant to main sink 1805 with respect to wall 1812. A third mirror sink 1822 is equidistant to main sink 1805 with respect to wall 1813. Since main sink 1805 is deployed on wall 1811, there is no mirror sink for main sink 1805 with respect to wall 1811.

Figure 18B:
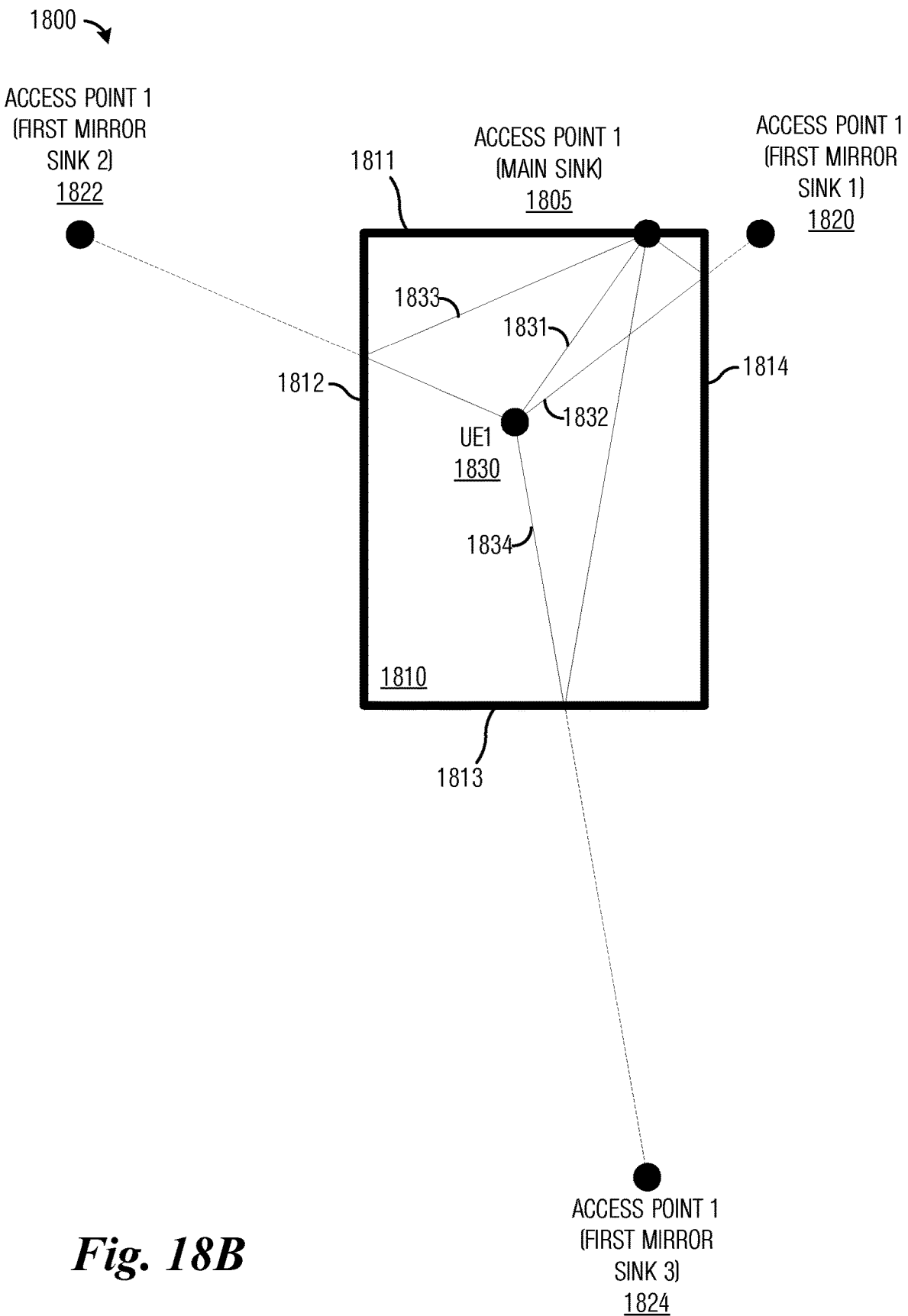
FIG. 18B illustrates example communications system of FIG. 18A highlighting signal paths arising from the main and mirror sinks with one source according to example embodiments described herein.

FIG. 18B illustrates example communications system of FIG. 18A highlighting signal paths arising from the main and mirror sinks with one source. A UE (UE1) 1830 is located within room 1810. Due to the four reflective surfaces of room 1810, there are four signal paths. A primary path 1831 exists between UE 1830 and main sink 1805. A first secondary path 1832 is directed towards first mirror sink 1820 until encountering wall 1814 and reflecting to main sink 1805, a second secondary path 1833 is directed towards second mirror sink 1822 until encountering wall 1812 and reflecting to main sink 105, and a third secondary path 1834 is directed towards third mirror sink 1824 until encountering wall 1813 and reflecting to main sink 1805.

Figure 18C:
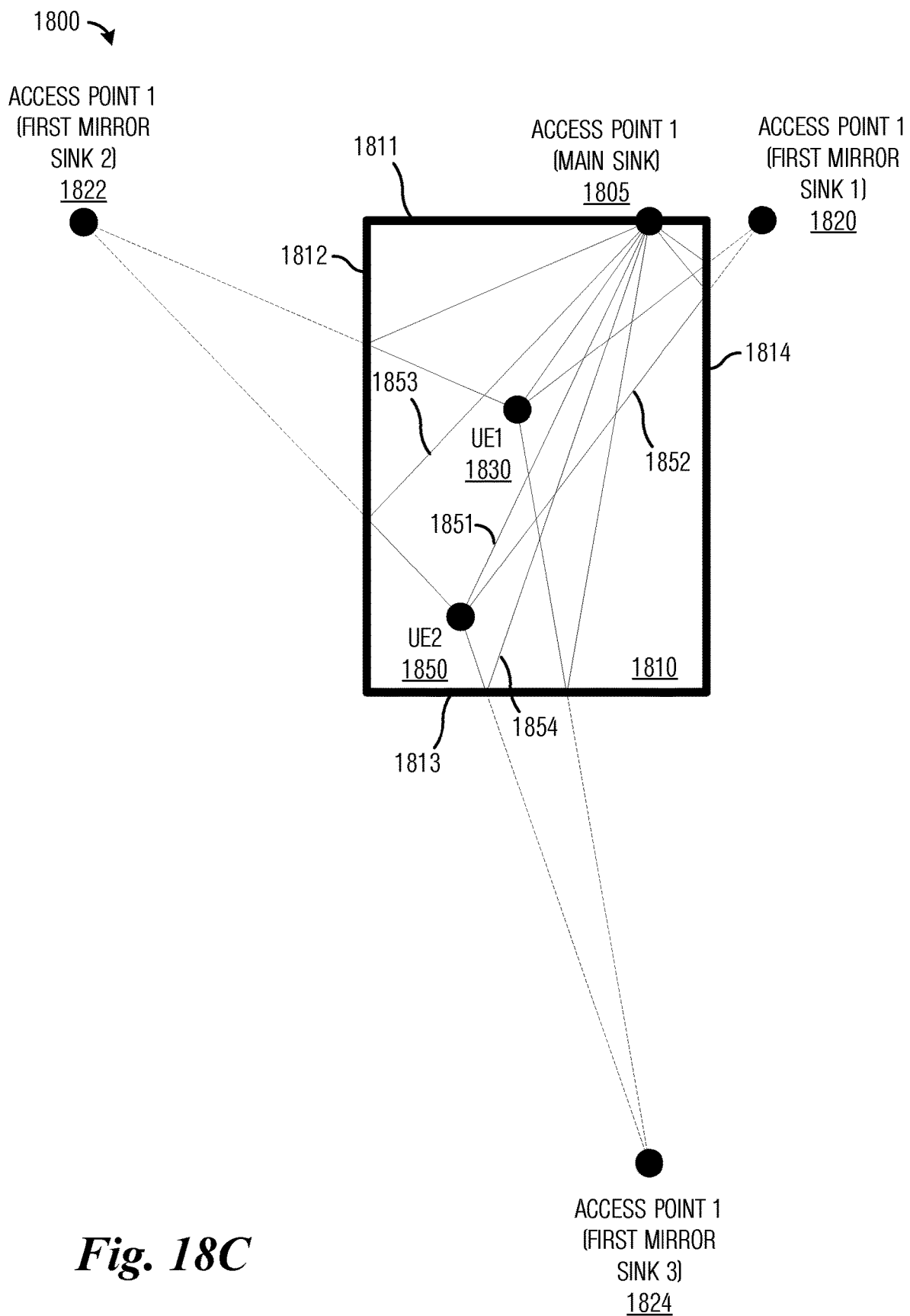
FIG. 18C illustrates example communications system of FIG. 18A highlighting signal paths arising from the main and mirror sinks with two sources according to example embodiments described herein.

FIG. 18C illustrates example communications system of FIG. 18A highlighting signal paths arising from the main and mirror sinks with two sources. As shown in FIG. 18C, a second UE (UE2) 1850 has joined UE 1830 in room 1810. Due to the four reflective surfaces of room 1810, there are four signal paths associated with second UE 1850. A primary path 1851 exists between second UE 1850 and main sink 1805. A first secondary path 1852 is directed towards first mirror sink 1820 until encountering wall 1814 and reflecting to main sink 1805, a second secondary path 1853 is directed towards second mirror sink 1822 until encountering wall 1812 and reflecting to main sink 105, and a third secondary path 1854 is directed towards third mirror sink 1824 until encountering wall 1813 and reflecting to main sink 1805.

According to an example embodiment, the associations between the main and/or mirror sources and paths are stored as generated in a database that allows for subsequent retrieval so that overhead involved in determining the associations are generally incurred only once. As an illustrative example, a reception point determines the locations of main and/or mirror sources and searches the database using the locations. The reception point may be able to retrieve associations between the main and/or mirror sources and paths, as well as locations of reflective surfaces, absorptive surfaces, and so on. Accessing the information stored in the database may save the reception point significant overhead. The database may be local or remote. The database may be accessible wirelessly or using a wireline connection. The database may be implemented in a standalone entity or it may be co-located with another entity.

According to an example embodiment, the associations between the main and/or mirror sinks and paths are stored as generated in a database that allows for subsequent retrieval so that overhead involved in determining the associations are generally incurred only once. As an illustrative example, a transmission point determines its own location and searches the database using the location. The transmission point may be able to retrieve associations between the main and/or mirror sinks and paths, as well as locations of reflective surfaces, absorptive surfaces, and so on. Accessing the information stored in the database may save the transmission point significant overhead. The database may be local or remote. The database may be accessible wirelessly or using a wireline connection. The database may be implemented in a standalone entity or it may be co-located with another entity.

According to an example embodiment, the information stored in the database is refined over time. As an illustrative example, a reception point is located at a position that already has information associated with it stored in the database but at a different time and/or day or date; the reception point is still able to make use of the information stored in the database to simplify its computations. The reception point may also be able to refine or enhance the quality of the information stored at the database by supplementing the information stored at the database by providing its own information. The multiple independently derived versions of the information (collected and derived at different times, days, or dates) may be combined to improve the quality of the information stored at the database. As an illustrative example, the multiple independently derived versions of the information may be combined (e.g., averaged, weighted and then averaged, and so forth). As another illustrative example, the multiple independently derived versions of the information may be stored with different time stamps, allowing future users to retrieve a version of the information that most closely matches their situation (e.g., time of day, day of week, day of month, and so on).

According to an example embodiment, the information stored in the database is refined over time. As an illustrative example, a transmission point is located at a position that already has information associated with it stored in the database but at a different time and/or day or date; the transmission point is still able to make use of the information stored in the database to simplify its computations. The transmission point may also be able to refine or enhance the quality of the information stored at the database by supplementing the information stored at the database by providing its own information. The multiple independently derived versions of the information (collected and derived at different times, days, or dates) may be combined to improve the quality of the information stored at the database. As an illustrative example, the multiple independently derived versions of the information may be combined (e.g., averaged, weighted and then averaged, and so forth). As another illustrative example, the multiple independently derived versions of the information may be stored with different time stamps, allowing future users to retrieve a version of the information that most closely matches their situation (e.g., time of day, day of week, day of month, and so on).

According to an example embodiment, the associations between the main and/or mirror sources and paths stored in a database are used to determine the locations of main and/or mirror sources that are blocked. As an illustrative example, the coordinates of reflective surfaces are retrieved from the database based on coordinates of the main and/or mirror sources. As an illustrative example, the location of a main source is retrieved from the database based on known coordinates of mirror sources and reflective surfaces.

According to an example embodiment, the associations between the main and/or mirror sinks and paths stored in a database are used to determine the locations of main and/or mirror sinks that are blocked. As an illustrative example, the coordinates of reflective surfaces are retrieved from the database based on coordinates of the main and/or mirror sinks. As an illustrative example, the location of a main sink is retrieved from the database based on known coordinates of mirror sinks and reflective surfaces.

FIG. 19A illustrates a flow diagram of example high level operations 1900 occurring in a device determining associations between sources (main and mirror) and paths. Operations 1900 may be indicative of operations occurring in a device, such as a reception point or a standalone device, determines associations between sources (main and mirror) and paths.

Operations 1900 begin with the device determining locations of the main source and the mirror sources (block 1905). The locations of the main source and the mirror sources may be determined by scanning for the locations or using analytical methods to find the locations. Scanning involves the device using its antennas to determine the locations of the main source and the mirror sources. FIG. 15 illustrates an example of a rectangular room with its main source and some mirror sources. As an illustrative example, the device uses a fast acquisition system and method as presented in co-assigned U.S. Patent Application entitled "System and Method for Large Scale Multiple Input Multiple Output Communications", application Ser. No. 14/867,931, filed Sep. 28, 2015, which is hereby incorporated herein by reference, to scan for the locations of the main source and the mirror sources.

As an alternative illustrative example, the device uses an analytical system and method to find the locations of the main source and the mirror sources. For discussion purposes, consider a scenario where the location of the main source is (x1, y1, z1) with a reflective surface located at (z=A·x+B·y+C), where A, B, and C are constants. It is possible to find the location of a mirror source that is symmetric to the main source relative to the reflective surface. First, the coordinates of a projection of the main source onto the reflective surface is found. The coordinates of projection (x0, y0, z0) satisfying the condition $$z0 = A \cdot x0 + B \cdot y0 + C,$$

which is obtained by minimizing the following expression with respect to (x0, y0, z0)

$$D^2 = (x1-x0)^2 + (y1-y0)^2 + (z1 - A \cdot x0 + B \cdot y0 + C)^2.$$

Therefore, $$\begin{cases} \frac{\partial D^2}{\partial x0} = -2 \cdot (x1 - x0) - 2 \cdot (z1 - A \cdot x0 - B \cdot y0 - C) \cdot A = 0 \\ \frac{\partial D^2}{\partial y0} = -2 \cdot (y1 - y0) - 2 \cdot (z1 - A \cdot x0 - B \cdot y0 - C) \cdot B = 0 \end{cases}$$

or $$\begin{cases} x1 - x0 = (A \cdot x0 + B \cdot y0 + C - z1) \cdot A \\ y1 - y0 = (A \cdot x0 + B \cdot y0 + C - z1) \cdot B \end{cases}$$

or $$\begin{cases} x1 - x0 = A \cdot A \cdot x0 + A \cdot B \cdot y0 + A \cdot C - A \cdot z1 \\ y1 - y0 = B \cdot A \cdot x0 + B \cdot B \cdot y0 + B \cdot C - B \cdot z1 \end{cases}$$

or $$\begin{cases} x1 = (A^2 + 1) \cdot x0 + A \cdot B \cdot y0 + A \cdot C - A \cdot z1 \\ y1 = (B^2 + 1) \cdot y0 + A \cdot B \cdot x0 + B \cdot C - B \cdot z1 \end{cases}$$

or $$\begin{cases} x1 = (A^2 + 1) \cdot x0 + A \cdot B \cdot y0 + A \cdot C - A \cdot z1 \\ y0 = \frac{y1 - A \cdot B \cdot x0 - B \cdot C + B \cdot z1}{(B^2 + 1)} \end{cases}$$

or $$x1 = (A^2 + 1) \cdot x0 + A \cdot B \cdot \left( \frac{y1 - A \cdot B \cdot x0 - B \cdot C + B \cdot z1}{(B^2 + 1)} \right) + A \cdot C - A \cdot z1$$

or $$x1 = \left( (A^2 + 1) - \left( \frac{A^2 \cdot B^2}{(B^2 + 1)} \right) \right) \cdot x0 + A \cdot B \cdot \left( \frac{y1 - B \cdot C + B \cdot z1}{(B^2 + 1)} \right) + A \cdot C - A \cdot z1.$$

The coordinates of the projection of the main source onto the reflective surface is expressible as $$x0 = \frac{x1 - A \cdot B \cdot \left( \frac{y1 - B \cdot C + B \cdot z1}{(B^2 + 1)} \right) - A \cdot C + A \cdot z1}{\left( (A^2 + 1) - \left( \frac{A^2 \cdot B^2}{(B^2 + 1)} \right) \right)}$$

$$y0 = \frac{y1 - A \cdot B \cdot x0 - B \cdot C + B \cdot z1}{(B^2 + 1)}$$

$$z0 = A \cdot x0 + B \cdot y0 + C.$$

The coordinates of the mirror source (x2, y2, z2) may be derived from the coordinates of the projection of the main source onto the reflective surface and the coordinates of the main source:

$$(x2,y2,z2) = (x0,y0,z0) + (x0,y0,z0) - (x1,y1,z1) = 2 \cdot (x0,y0,z0) - (x1,y1,z1)$$

hence, $$x2 = 2 \cdot x0 - x1$$

$$y2 = 2 \cdot y0 - y1$$

$$z2 = 2 \cdot z0 - z1$$

The device determines primary paths and secondary paths (block 1907). As discussed previously, primary paths are direct paths from main sources to reception points, while secondary paths are paths that include one or more reflections from main sources to reception points. The secondary paths may be modeled as paths without reflections (similar to primary paths but not originating from a main source) from mirror sources to reception points.

The device traces a secondary path (block 1909). The device may trace a secondary path from a plurality of secondary paths found in block 1907. The device traces the secondary path starting from the main source to the reception point. The device determines if the secondary path crosses any surfaces (reflective or otherwise) (block 1911). Where the secondary path crosses a surface is referred to as a crossing point. The determination if the secondary path crosses any surfaces may be in accordance with physical environmental deployment (PED) information regarding the physical layout of the environment in which the communications device and the main sources are deployed. The PED information may include information about number and type (such as reflective or absorptive properties, penetration properties, and so on) of surfaces that reflect or absorb electromagnetic beams (such as walls, doors, ceilings, floors, and so forth), significant objects that reflect or absorb electromagnetic beams (such as large furniture pieces, large appliances, large mirrors, filing cabinets, computer servers, large televisions, and so on), less significant objects that reflect or absorb electromagnetic beams (such as small furniture pieces, art pieces, small appliances, small computers, displays, small televisions, printers, scanners, copiers, and the like), and the like. The PED information may also include information related to an extent of signal coverage since the extent of signal coverage has a role in determining which reception point sees which mirror source.

The device determines mirror sources that correspond with crossing points (block 1913). A mirror source corresponds with a crossing point if it is aligned with the crossing point and a destination of the secondary path, which may be a reception point or a subsequent crossing point. The device associates each mirror source that corresponds with a crossing point with its respective crossing point (block 1915).

Blocks 1909, 1911, 1913, and 1915 may be referred to collectively as determining associations between sources and paths (blocks 1917).

The device may be a standalone device responsible for determining paths (primary and secondary), locations of sources (main and mirror), and so on. In such a situation, the device may provide information about the paths and sources to a database. The device may communicate information about the paths and sources to a neighboring device having similar information obtained by the aforementioned example embodiments from its own vintage point, therefore allowing a network of devices to form a collective picture about all the main sources and mirror sources pertaining to the entire network. Alternatively, the device may be a standalone device responsible for performing channel estimation. In such a situation, the device may use information about the paths and sources to estimate channels. The device may provide information about the channel estimates to transmission points and reception points, or the device may provide the information about the channel estimates to a database. Alternatively, the device may be a communications device, such as a reception point or a transmission point. In such a situation, the device use information about the paths and sources to estimate channels for its own use. The device may also provide the information about the channel estimates to a database.

FIG. 19B illustrates a flow diagram of example high level operations 1950 occurring in a device determining associations between sinks (main and mirror) and paths. Operations 1950 may be indicative of operations occurring in a device, such as a transmission point or a standalone device, determines associations between sinks (main and mirror) and paths.

Operations 1950 begin with the device determining locations of the main sink and the mirror sinks (block 1955). The locations of the main sink and the mirror sinks may be determined by scanning for the locations or using analytical methods to find the locations. Scanning involves the device using its antennas to determine the locations of the main sink and the mirror sinks. As an illustrative example, the device may transmit a reference signal (or some other signal known by both the transmission point and the main sink) along various directions and the main sink responds with a receipt acknowledgement. The device then associates a direction corresponding to a transmission of the reference signal as the direction of a sink (either the main sink or a mirror sink). The location of the sink may be derived from the direction. Additional information (e.g., location information) may be used to determine the actual direction of the main sink. As an alternative illustrative example, the device uses an analytical system and method, such as described previously, to find the locations of the main sink and the mirror sinks.

The device determines the primary paths and secondary paths (block 1957). As discussed previously, primary paths are direct paths from the device to main sinks, while secondary paths are paths that include one or more reflections from the device to main sinks. The secondary paths may be modeled as paths without reflections (similar to primary paths but not ending at a main sink) from the device to mirror sinks.

The device traces a secondary path (block 1959). The device may trace a secondary path from a plurality of secondary paths found in block 1957. The device traces the secondary path starting from the device to the main sink. The device determines if the secondary path crosses any surfaces (reflective or otherwise) (block 1961). Where the secondary path crosses a surface is referred to as a crossing point. The determination if the secondary path crosses any surfaces may be in accordance with the PED information regarding the physical layout of the environment in which the device and the main sinks are deployed. The device determines mirror sinks that correspond with crossing points (block 1963). A mirror sink corresponds with a crossing point if it is aligned with the crossing point and an origination of the secondary path, which may be the device or a subsequent crossing point. The device associates each mirror sink that corresponds with a crossing point with its respective crossing point (block 1965). Blocks 1959, 1961, 1963, and 1965 may be referred to collectively as determining associations between sinks and paths (blocks 1967).

FIG. 20A illustrates a flow diagram of operations 2000 occurring in a device performing channel estimation from information about sources and paths. Operations 2000 may be indicative of operations occurring in a device, such as a reception point or a standalone device, performs channel estimation from information about sources and paths.

Operations 2000 begin with the device determining sources that have non-negligible energy (block 2005). As discussed previously, when an electromagnetic beam reflects off a reflective surface, a portion of the energy present in the electromagnetic beam is absorbed by the reflective surface. Furthermore, there is also propagation loss. Therefore, the energy of the mirror sources decrease as the number of reflections increase. Eventually, the energy of the mirror sources for paths that have many reflections (these mirror sources are referred to as higher order mirror sources) approaches zero. Hence, the number of significant mirror sources is finite. The device may simply specify a threshold energy level relative to the energy level of the main source and the mirror sources with energy levels exceeding the threshold energy level are non-negligible while those that do not exceed the threshold energy level are negligible. The device determines which of the mirror sources with non-negligible energy are visible to the reception point (block 2007). Those that are not visible to the reception point may be removed from consideration. The device determines a channel impulse response H($\omega$) as a sum of sources that are visible to the reception point (block 2009). As an illustrative example, the channel impulse response may be expressed as $$H(\omega) = \sum_{n=0}^{N-1} \sqrt{G_n} \cdot \left(\frac{2 \cdot D_n \cdot \omega}{c}\right)^2 \cdot \exp\left(j \cdot \frac{D_n \cdot \omega}{c}\right)$$

where n is a source index (n=0, 1, 2, ..., N−1) and n=0 is the main source, $D_n$ is a distance between the reception point and source n, $G_n$ is an energy of source n.

FIG. 20B illustrates a flow diagram of operations 2050 occurring in a device performing channel estimation from information about sinks and paths. Operations 2050 may be indicative of operations occurring in a device, such as a reception point or a standalone device, performs channel estimation from information about sinks and paths.

Operations 2050 begin with the device determining sinks that receive non-negligible energy (block 2055). As discussed previously, when an electromagnetic beam reflects off a reflective surface, a portion of the energy present in the electromagnetic beam is absorbed by the reflective surface. Furthermore, there is also propagation loss. Therefore, the energy of the electromagnetic beam of the device decreases as the number of reflections increase. Eventually, the energy of the electromagnetic beam of the device for paths that have many reflections (the mirror sinks associated with these paths are referred to as higher order mirror sinks) approaches zero. Hence, the number of significant mirror sinks is finite. The device may simply specify a threshold energy level relative to the energy level of the main sink and the mirror sinks with energy levels exceeding the threshold energy level are non-negligible while those that do not exceed the threshold energy level are negligible. The device determines which of the mirror sinks with non-negligible energy are visible to the device (block 2057). Those that are not visible to the device may be removed from consideration. The device determines a channel impulse response H(ω) as a sum of sinks that are visible to the device (block 2059). As an illustrative example, the channel impulse response may be expressed as $$H(\omega) = \sum_{n=0}^{N-1} \sqrt{G_n} \cdot \left(\frac{2 \cdot D_n \cdot \omega}{c}\right)^2 \cdot \exp\left(j \cdot \frac{D_n \cdot \omega}{c}\right)$$

where n is a sink index (n=0, 1, 2, ..., N−1) and n=0 is the main sink, $D_n$ is a distance between the device and sink n, and $G_n$ is an energy of a transmission associated with sink n.

Figure 21:
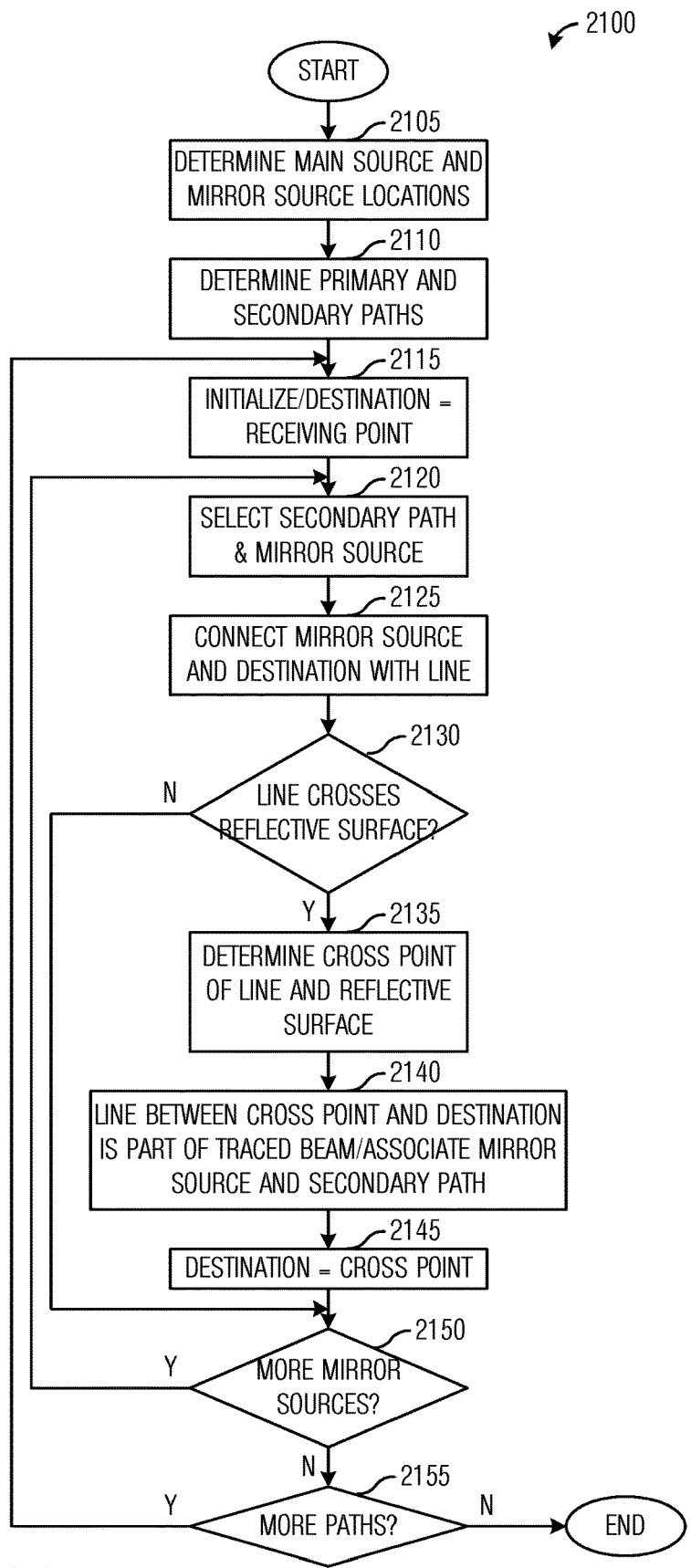
FIG. 21 illustrates a flow diagram of detailed operations occurring in a device determining associations between sources (main and mirror) and paths according to example embodiments described herein.

FIG. 21 illustrates a flow diagram of detailed operations 2100 occurring in a device determining associations between sources (main and mirror) and paths. Operations 2100 may be indicative of operations occurring in a device, such as a reception point or a standalone device, determines associations between sources (main and mirror) and paths. Operations 2100 may be a detailed view of an example implementation of operations 1800 for higher order mirror sources (e.g., second, third, fourth, and so on, order mirror sources). A similar example implementation exists for determining associations between sinks (main and mirror) and paths.

Operations 2100 begin with the device determining locations of main sources and mirror sources (block 2105). Determining the locations of main sources and mirror sources may be performed by scanning and/or analytical techniques. The device determines primary paths and secondary paths (block 2110).

The device initializes variables (block 2115). The variables initialized include a destination being set to the reception point. The device selects a secondary path and a mirror source (block 2120). The device connects the mirror source to the destination with a line (block 2125). The device performs a check to determine if the line crosses a surface, e.g., a reflective or absorptive surface (block 2130). If the line crosses a surface the device determines a point wherein the line crosses the surface, which is referred to as a cross point (block 2135). The device determines that a line between the cross point and the destination is part of a traced beam, thereby associating the mirror source with the secondary path (block 2140) and sets the destination to be the cross point (block 2145).

The device performs a check to determine if there are more mirror sources not checked with respect to the selected secondary path (block 2150). If there are more mirror sources not checked with respect to the selected secondary path, the device returns to block 2120 to select a mirror source to check with respect to the selected secondary path. If there are no more mirror sources in the selected secondary path, the device performs a check to determine if there are more secondary paths (block 2155). If there are more secondary paths, the device returns to block 2115 to reinitialize the variables and repeat the beam tracing with another secondary path. If there are no more secondary paths, operations 2000 terminates.

FIG. 22A illustrates a diagram 2200 of a relationship between a main source 2205, a mirror source 2210, and a reflective surface 2215. As shown in FIG. 22A, there is a relationship between main source 2205, mirror source 2210, and reflective surface 2215 that may be described geometrically. As an illustrative example, given a first angle 2220 between main source 2205 and reflective surface 2215 (or an extension thereof if reflective surface 2215 does not extend sufficiently to allow a right angle to form), a complementary second angle 2222 exists between mirror source 2210 and reflective surface 2215 (or the extension thereof). Similarly, there is a relationship between a first distance 2225 between main source 2205 and reflective surface 2215 and a second distance 2227 between mirror source 2210 and reflective surface 2215. As an example, when first angle 2220 is 90 degrees, second angle 2222 is also 90 degrees and first distance 2225 is also equal to second distance 2227.

If some of the information about the paths or the sources is missing, it is possible to determine the missing information from the information that is known. As an illustrative example, it is possible to determine the location of reflective surface 2215 from the location of main source 2205 and mirror source 2210. As another illustrative example, it is possible to determine the location of main source 2205 from the location of mirror source 2210 and reflective surface 2215.

FIG. 22B illustrates a diagram 2250 of a relationship between a main sink 2255, a mirror sink 2260, and a reflective surface 2265. As shown in FIG. 22B, there is a relationship between main source 2255, mirror source 2260, and reflective surface 2265 that may be described geometrically. As an illustrative example, given a first angle 2270 between main source 2255 and reflective surface 2265 (or an extension thereof if reflective surface 2265 does not extend sufficiently to allow a right angle to form), a complementary second angle 2272 exists between mirror source 2260 and reflective surface 2265 (or the extension thereof). Similarly, there is a relationship between a first distance 2275 between main source 2255 and reflective surface 2265 and a second distance 2277 between mirror source 2260 and reflective surface 2265. As an example, when first angle 2270 is 90 degrees, second angle 2272 is also 90 degrees and first distance 2275 is also equal to second distance 2277.

If some of the information about the paths or the sinks is missing, it is possible to determine the missing information from the information that is known. As an illustrative example, it is possible to determine the location of reflective surface 2265 from the location of main sink 2255 and mirror sink 2260. As another illustrative example, it is possible to determine the location of main sink 2255 from the location of mirror sink 2260 and reflective surface 2265.

According to an example embodiment, the missing information is determined by a device in accordance with information about the paths and the sources or sinks, as well as the PED information retrieved from a database. The information about the paths and the sources or sinks, along with the PED information retrieved from the database may be incomplete; therefore, the device has to determine the missing information from the information available from the database. Although the device has to determine the missing information, it may be computationally advantageous when compared to the device having to fully derive all of the information using scanning, measuring, and computing techniques as described herein.

Figure 23:
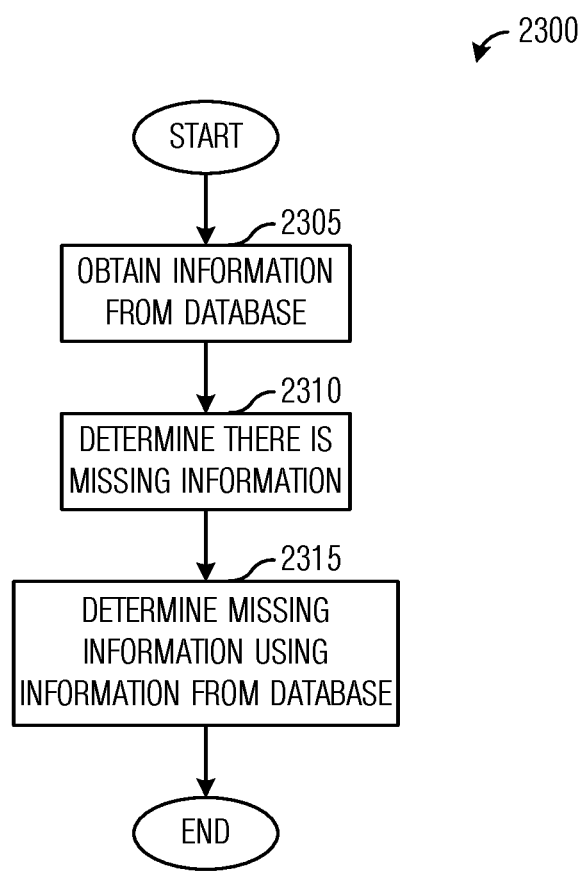
FIG. 23 illustrates a flow diagram of example operations occurring in a device determining missing information from information retrieved from a database according to example embodiments described herein.

FIG. 23 illustrates a flow diagram of example operations 2300 occurring in a device determining missing information from information retrieved from a database. Operations 2300 may be indicative of operations occurring in a device, such as a reception point or a standalone device, determining missing information from information retrieved from a database.

Operations 2300 begin with the device obtaining information from a database (block 2305). The device may send a request or query to the database and receive a message including the information from the database. Alternatively, the device may automatically receive a message including the information from the database as part of mobility operation, such as an attachment procedure, a handover, and so on. The device determines that there is missing information (block 2310) and determines the missing information from the information stored in the database (block 2315).

In general, a communications device may be able to only see its own set of main and mirror sources and/or sinks. Furthermore, some main and mirror sources and/or sinks are visible by many communications devices. The main and mirror sources and/or sinks visible to communications devices are dependent on the environment, such as the number of flat reflective surfaces and their dimensions. If there are a small number of large flat surfaces, then the environment may be represented as a superposition of a limited number of wide sector radiation main and mirror sources and/or sinks. Such an environment may be referred to as a low entropy environment. FIG. 24 illustrates an example low entropy environment 2400. If the environment includes a large number of small flat surfaces, then the environment may be represented as a superposition of a large number of narrow sector radiation main and mirror sources and/or sinks. Such an environment may be referred to as a high entropy environment. FIG. 25 illustrates an example high entropy environment 2500. High entropy environment has a large number of narrow sector radiation main and mirror sources and/or sinks.

According to an example embodiment, in a low entropy environment, many communications devices will be able to see many common main and mirror sources and/or sinks and a coordinated approach yields significant benefits by Reducing the number of channel parameters that are estimated. Instead of independent estimation of each antenna channel, a limited number channels of main and mirror sources and/or sinks may be estimated. The amount of channel information that must be exchanged between different communications devices is reduced.

The quality of the estimation is increased because the multiple communications devices can mutually estimate the channels of main and mirror sources and/or sinks.

In a high entropy environment, where each communications device has a unique set of main and mirror sources and/or sinks, the coordinate approach may converge to the conventional independent estimation technique. However, estimation performance is not degraded so nothing is lost.

Figure 26:
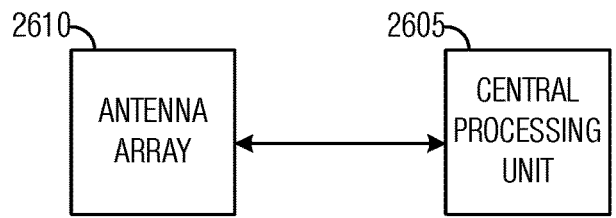
FIG. 26 illustrates an example MIMO communications device, highlighting the architecture of MIMO communications device according to example embodiments described herein.

FIG. 26 illustrates an example MIMO communications device 2600, highlighting the architecture of MIMO communications device 2600. MIMO communications device 2600 includes a central processing unit 2605 and an array of antennas 2610 coupled to central processing unit 2605. Array of antennas 2610 may include any number of antennas, but for large scale MIMO implementations, it is expected that array of antennas 2610 includes on the order of hundreds, thousands, tens of thousands, or more antennas. Central processing unit 2605 may be a single processor or a multi-processor system. Not shown in FIG. 26 are ancillary circuitry such as memories, network interfaces, user interfaces, power supplies, and so forth. A transmission source or a transmission sink may be implemented using MIMO communications device 2600.

Figure 27:
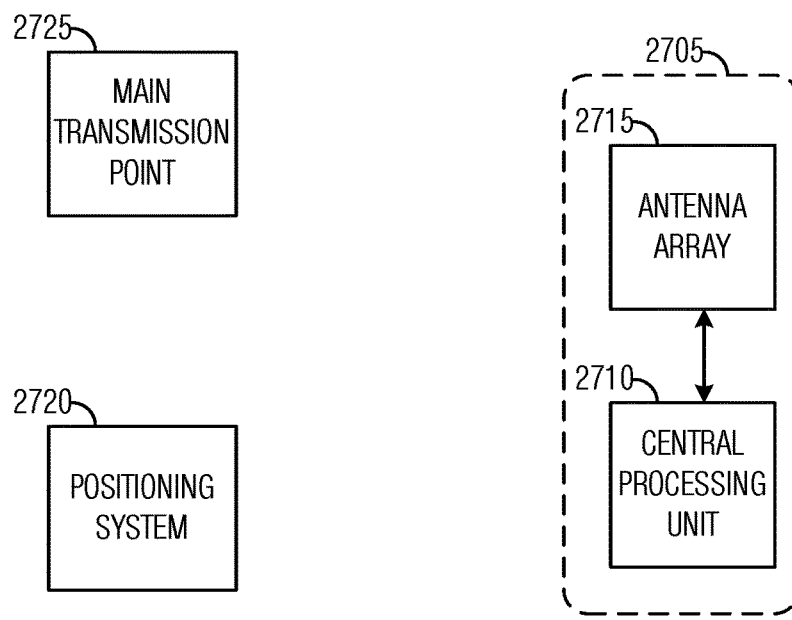
FIG. 27 illustrates an example large scale MIMO communications system according to example embodiments described herein.

FIG. 27 illustrates an example large scale MIMO communications system 2700. Communications system 2700 includes a large scale MIMO communications device 2705 with a central processing unit 2710 and an antenna array 2715. Antennas of antenna array 2715 may be arranged in a one-, two-, or three-dimensional array with regular or irregular spacing between antennas. Communications system 2700 also includes a positioning system 2720 that is configured to transmit orthogonal reference signals to assist in determining position information of antennas of antenna array 2715. Communications system 2700 also includes a main transmission source 2725 communicating with large scale MIMO communications device 2705.

Figure 28:
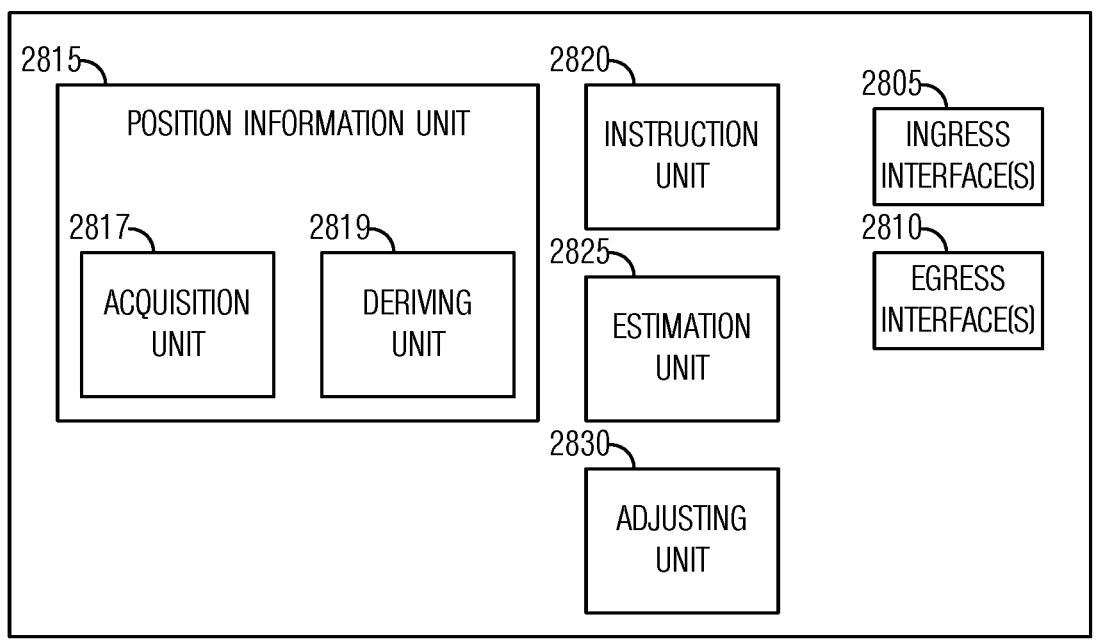
FIG. 28 illustrates a block diagram of an embodiment communications device according to example embodiments described herein.

FIG. 28 illustrates a block diagram of an embodiment communications device 2800. Communications device 2800 is adapted to perform channel estimation. As shown in FIG. 28, communications device 2800 includes one or more ingress interfaces 2805, one or more egress interfaces 2810, a position information unit 2815, an instruction unit 2820, an estimation unit 2825, and an adjusting unit 2830. The one or more ingress interfaces 2805 may be configured to receive information (e.g., instantaneous channel feedback, statistical channel information, etc.) from devices (e.g., receiving devices) in a wireless network, and the one or more egress interfaces 2810 may be configured to send precoded data streams to devices (e.g., receiving devices) in the wireless network. Position information unit 2815 may include hardware and/or software adapted to determine position information a main transmission sink having a primary transmission path to the communications device and of at least one mirror transmission sink associated with the main transmission sink by at least one secondary transmission path between the main transmission sink and the communications device. Estimation unit 2825 may include hardware and/or software adapted to estimate primary channels between the communications device and antennas of an antenna array of the main transmission sink and secondary channels between the communications device and antennas of an antenna array of the at least one mirror transmission sink, the estimating is at least partially based on the position information of the main transmission sink and the at least one mirror transmission sink and position information of the antennas in the antenna arrays. Instruction unit 2820 may include hardware and/or software adapted to instruct the use of the estimated primary channels and the estimated secondary channels. Estimation unit 2825 may include hardware and/or software adapted to adjust the estimated primary channels and the estimated secondary channels in accordance with estimates of the primary channels and the secondary channels from other communications devices.

Position information unit 2815 includes an acquisition unit 2817 and a deriving unit 2819. Position information unit 2815 may include hardware and/or software adapted to receive the position information of the main transmission sink in a message and/or receive the position information of the at least one mirror transmission sink in a message. Acquisition unit 2817 may include hardware and/or software adapted to perform an acquisition procedure to determine the position information of the main transmission sink. Deriving unit 2819 may include hardware and/or software adapted to derive the position information of the at least one mirror transmission sink in accordance with the position information of the main transmission sink and PED information regarding a physical layout of a communications system including the communications device and the main transmission sink.

Figure 29:
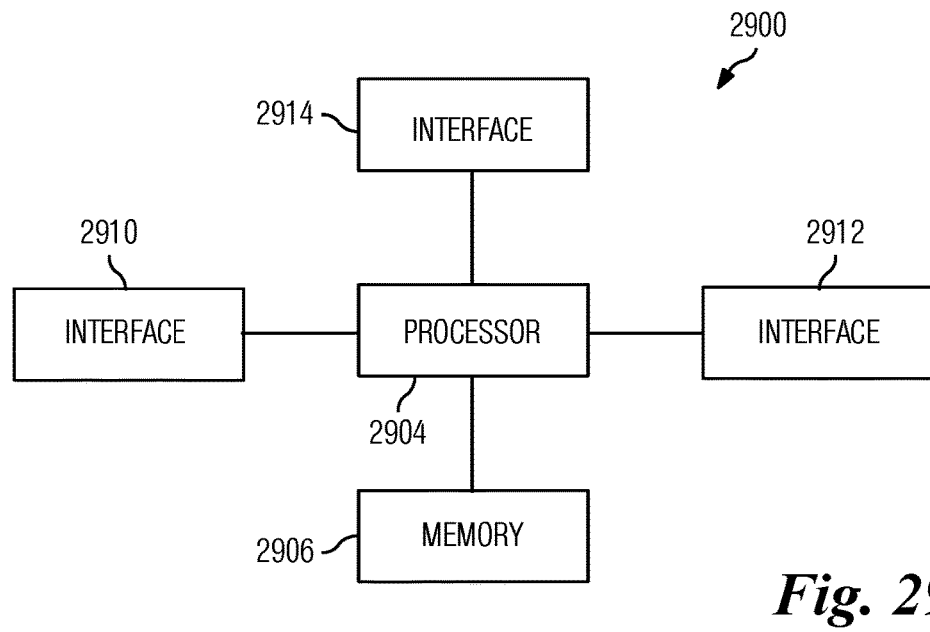
FIG. 29 illustrates a block diagram of an embodiment processing system for performing methods described herein.

Instruction unit 2820 may include hardware and/or software adapted to at least one of save information regarding the estimated primary channels and the estimated secondary channels, and signal indications of the estimated primary channels and the estimated secondary channels. Instruction unit 2820 may include hardware and/or software adapted to generate beamforming coefficients in accordance with the estimated primary channels and the estimated secondary channels and the position information of the antennas in the antenna arrays, and provide the beamforming coefficients to antenna units of the communications device FIG. 29 illustrates a block diagram of an embodiment processing system 2900 for performing methods described herein, which may be installed in a host device. As shown, the processing system 2900 includes a processor 2904, a memory 2906, and interfaces 2910-2914, which may (or may not) be arranged as shown in FIG. 29. The processor 2904 may be any component or collection of components adapted to perform computations and/or other processing related tasks, and the memory 2906 may be any component or collection of components adapted to store programming and/or instructions for execution by the processor 2904. In an embodiment, the memory 2906 includes a non-transitory computer readable medium. The interfaces 2910, 2912, 2914 may be any component or collection of components that allow the processing system 2900 to communicate with other devices/components and/or a user. For example, one or more of the interfaces 2910, 2912, 2914 may be adapted to communicate data, control, or management messages from the processor 2904 to applications installed on the host device and/or a remote device. As another example, one or more of the interfaces 2910, 2912, 2914 may be adapted to allow a user or user device (e.g., personal computer (PC), etc.) to interact/communicate with the processing system 2900. The processing system 2900 may include additional components not depicted in FIG. 29, such as long term storage (e.g., non-volatile memory, etc.).

In some embodiments, the processing system 2900 is included in a network device that is accessing, or part otherwise of, a telecommunications network. In one example, the processing system 2900 is in a network-side device in a wireless or wireline telecommunications network, such as a base station, a relay station, a scheduler, a controller, a gateway, a router, an applications server, or any other device in the telecommunications network. In other embodiments, the processing system 2900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 30:
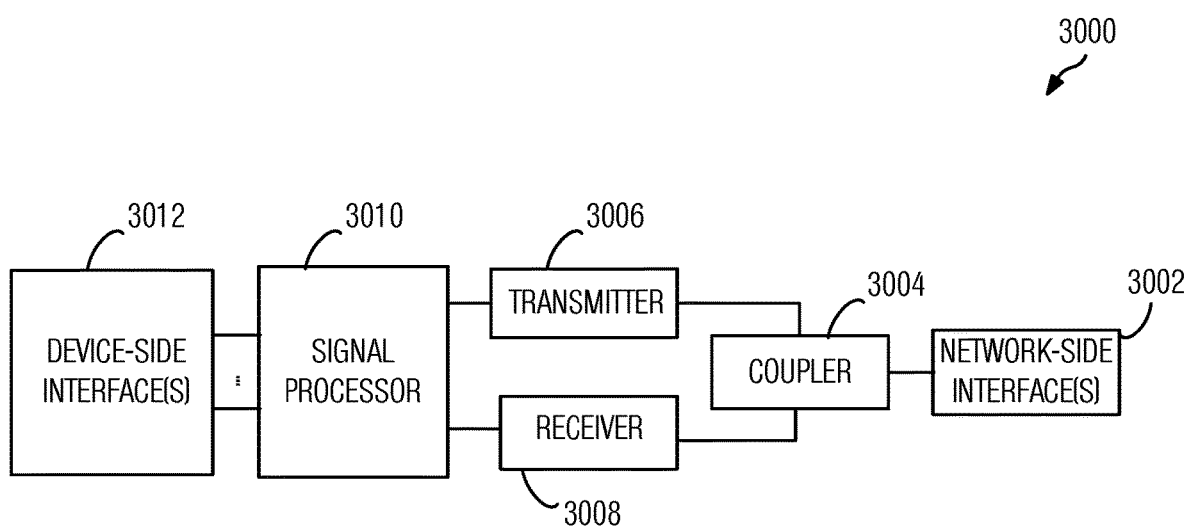
FIG. 30 illustrates a block diagram of a transceiver adapted to transmit and receive signaling over a telecommunications network according to example embodiments described herein.

In some embodiments, one or more of the interfaces 2910, 2912, 2914 connects the processing system 2900 to a transceiver adapted to transmit and receive signaling over the telecommunications network. FIG. 30 illustrates a block diagram of a transceiver 3000 adapted to transmit and receive signaling over a telecommunications network. The transceiver 3000 may be installed in a host device. As shown, the transceiver 3000 comprises a network-side interface 3002, a coupler 3004, a transmitter 3006, a receiver 3008, a signal processor 3010, and a device-side interface 3012. The network-side interface 3002 may include any component or collection of components adapted to transmit or receive signaling over a wireless or wireline telecommunications network. The coupler 3004 may include any component or collection of components adapted to facilitate bi-directional communication over the network-side interface 3002. The transmitter 3006 may include any component or collection of components (e.g., up-converter, power amplifier, etc.) adapted to convert a baseband signal into a modulated carrier signal suitable for transmission over the network-side interface 3002. The receiver 3008 may include any component or collection of components (e.g., down-converter, low noise amplifier, etc.) adapted to convert a carrier signal received over the network-side interface 3002 into a baseband signal. The signal processor 3010 may include any component or collection of components adapted to convert a baseband signal into a data signal suitable for communication over the device-side interface(s) 3012, or vice-versa. The device-side interface(s) 3012 may include any component or collection of components adapted to communicate data-signals between the signal processor 3010 and components within the host device (e.g., the processing system 2900, local area network (LAN) ports, etc.).

The transceiver 3000 may transmit and receive signaling over any type of communications medium. In some embodiments, the transceiver 3000 transmits and receives signaling over a wireless medium. For example, the transceiver 3000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 3002 comprises one or more antenna/radiating elements. For example, the network-side interface 3002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 3000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, an estimating unit/module, an instructing unit/module, a deriving unit/module, a providing unit/module, an exchanging unit/module, a storing unit/module, and/or an adjusting unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and the scope of the disclosure as defined by the amended claims.

What is claimed is:

1. A method for channel estimation, the method comprising:
   determining, by a communications device, position information of a main transmission sink having a primary transmission path to the communications device and of at least one mirror transmission sink associated with the main transmission sink by at least one secondary transmission path between the main transmission sink and the communications device;
   estimating, by the communications device, primary channels between the communications device and individual antennas of an antenna array of the main transmission sink, and secondary channels between the communications device and individual antennas of an antenna array of the at least one mirror transmission sink, the estimating at least partially based on the position information of the main transmission sink and the at least one mirror transmission sink and on different position information of each of the individual antennas in the antenna arrays;
   instructing, by the communications device, use of the estimated primary channels and the estimated secondary channels; and
   adjusting, by the communications device, the estimated primary channels and the estimated secondary channels in accordance with estimates of the primary channels and the secondary channels from other communications devices.

2. The method of claim 1, wherein determining the position information of the main transmission sink comprises receiving the position information of the main transmission sink in a message.

3. The method of claim 1, wherein determining the position information of the main transmission sink comprises performing an acquisition procedure to determine the position information of the main transmission sink.

4. The method of claim 1, wherein determining the position information of the at least one mirror transmission sink comprises receiving the position information of the at least one mirror transmission sink in a message.

5. The method of claim 1, wherein determining the position information of the at least one mirror transmission sink comprises deriving the position information of the at least one mirror transmission sink in accordance with the position information of the main transmission sink and physical environmental deployment (PED) information regarding a physical layout of a communications system including the communications device and the main transmission sink.

6. The method of claim 5, wherein the PED information comprises information about at least one of a number, a location, a type, a shape, a reflection property, a penetration property, and an orientation of surfaces that reflect transmissions, and a number, a location, a type, a shape, an absorption property, a penetration property, or an orientation of surfaces that absorb transmissions.

7. The method of claim 1, wherein instructing the use of the estimated primary channels and the estimated secondary channels comprises at least one of saving information regarding the estimated primary channels and the estimated secondary channels, and signaling indications of the estimated primary channels and the estimated secondary channels.

8. The method of claim 1, wherein the communications device is in a near field of the main transmission sink.

9. The method of claim 1, further comprising:
   exchanging information of the estimated primary channels and the estimated secondary channels with the other communications devices.

10. The method of claim 1, further comprising:
    storing the estimated primary channels and the estimated secondary channels in a database.

11. A method for channel estimation, the method comprising:
    determining, by a communications device, position information of a main transmission sink having a primary transmission path to the communications device and of at least one mirror transmission sink associated with the main transmission sink by at least one secondary transmission path between the main transmission sink and the communications device;
    estimating, by the communications device, primary channels between the communications device and individual antennas of an antenna array of the main transmission sink, and secondary channels between the communications device and individual antennas of an antenna array of the at least one mirror transmission sink, the estimating at least partially based on the position information of the main transmission sink and the at least one mirror transmission sink and on different position information of each of the individual antennas in the antenna arrays; and
    instructing, by the communications device, use of the estimated primary channels and the estimated secondary channels, wherein instructing the use of the estimated primary channels and the estimated secondary channels includes generating beamforming coefficients in accordance with the estimated primary channels and the estimated secondary channels and the position information of the individual antennas in the antenna arrays and providing the beamforming coefficients to antenna units of the communications device.

12. A communications device comprising:
    a non-transitory memory storage comprising instructions; and
    a processor in communication with the non-transitory memory storage, wherein the processor executes the instructions to:
      determine position information of a main transmission sink having a primary transmission path to the communications device and of at least one mirror transmission sink associated with the main transmission sink by at least one secondary transmission path between the main transmission sink and the communications device,
      estimate primary channels between the communications device and individual antennas of an antenna array of the main transmission sink, and secondary channels between the communications device and individual antennas of an antenna array of the at least one mirror transmission sink, wherein the estimating is at least partially based on the position information of the main transmission sink and the at least one mirror transmission sink and on different position information of each of the individual antennas in the antenna arrays,
      instruct use of the estimated primary channels and the estimated secondary channels, and
      adjust the estimated primary channels and the estimated secondary channels in accordance with estimates of the primary channels and the secondary channels from other communications devices.

13. The communications device of claim 12, wherein the processor executes the instructions to:
   generate beamforming coefficients in accordance with the estimated primary channels and the estimated secondary channels and the position information of the individual antennas in the antenna arrays, and
   provide the beamforming coefficients to antenna units of the communications device.

14. The communications device of claim 12, wherein the processor executes the instructions to exchange information of the estimated primary channels and the estimated secondary channels with the other communications devices.

15. The communications device of claim 12, wherein the processor executes the instructions to store the estimated primary channels and the estimated secondary channels in a database.

16. The communications device of claim 12, wherein the communications device is a user equipment (UE).

* * * * *